Inventor
JOHN EDWARD FLOOD
By
Attorney

AUTOMATIC TELEPHONE SYSTEMS

Filed Nov. 29, 1955 23 Sheets-Sheet 2

Inventor
JOHN EDWARD FLOOD

By

Attorney

June 9, 1959 J. E. FLOOD 2,890,284

AUTOMATIC TELEPHONE SYSTEMS

Filed Nov. 29, 1955 23 Sheets-Sheet 3

Inventor
JOHN EDWARD FLOOD

By

Attorney

Inventor
JOHN EDWARD FLOOD

By

Attorney

June 9, 1959 J. E. FLOOD 2,890,284

AUTOMATIC TELEPHONE SYSTEMS

Filed Nov. 29, 1955 23 Sheets-Sheet 5

*Inventor*
JOHN EDWARD FLOOD

*By*

*Attorney*

June 9, 1959 J. E. FLOOD 2,890,284

AUTOMATIC TELEPHONE SYSTEMS

Filed Nov. 29, 1955

23 Sheets-Sheet 6

*Inventor*
JOHN EDWARD FLOOD

*By*

*Attorney*

Inventor
JOHN EDWARD FLOOD
By
Attorney

Inventor
JOHN EDWARD FLOOD
By
Attorney

Inventor
JOHN EDWARD FLOOD
By
Attorney

Inventor
JOHN EDWARD FLOOD
By
Attorney

June 9, 1959 J. E. FLOOD 2,890,284

AUTOMATIC TELEPHONE SYSTEMS

Filed Nov. 29, 1955 23 Sheets-Sheet 11

Inventor
JOHN EDWARD FLOOD

By

Attorney

Inventor
JOHN EDWARD FLOOD

By

Attorney

June 9, 1959 J. E. FLOOD 2,890,284

AUTOMATIC TELEPHONE SYSTEMS

Filed Nov. 29, 1955 23 Sheets-Sheet 13

SPL2 AND ES

Inventor
JOHN EDWARD FLOOD

By

Attorney

June 9, 1959 J. E. FLOOD 2,890,284

AUTOMATIC TELEPHONE SYSTEMS

Filed Nov. 29, 1955 23 Sheets-Sheet 14

Inventor
JOHN EDWARD FLOOD

By

Attorney

Inventor
JOHN EDWARD FLOOD

By

Attorney

Inventor
JOHN EDWARD FLOOD
By
Attorney

Inventor
JOHN EDWARD FLOOD
By
Attorney

Inventor
JOHN EDWARD FLOOD

By

Attorney

Inventor
JOHN EDWARD FLOOD

By

Attorney

Inventor
JOHN EDWARD FLOOD
By
Attorney

June 9, 1959 J. E. FLOOD 2,890,284

AUTOMATIC TELEPHONE SYSTEMS

Filed Nov. 29, 1955 23 Sheets-Sheet 21

Inventor
JOHN EDWARD FLOOD

By

Attorney

June 9, 1959 J. E. FLOOD 2,890,284

AUTOMATIC TELEPHONE SYSTEMS

Filed Nov. 29, 1955 23 Sheets-Sheet 22

Inventor
JOHN EDWARD FLOOD
By
Attorney

June 9, 1959 J. E. FLOOD 2,890,284

AUTOMATIC TELEPHONE SYSTEMS

Filed Nov. 29, 1955 23 Sheets-Sheet 23

Inventor
JOHN EDWARD FLOOD

By

Attorney

United States Patent Office 2,890,284
Patented June 9, 1959

2,890,284

AUTOMATIC TELEPHONE SYSTEMS

John Edward Flood, Herne Hill, London, England, assignor to Siemens Edison Swan Limited, a British company Application November 29, 1955, Serial No. 549,804

3 Claims. (Cl. 179—15)

Figure 1:
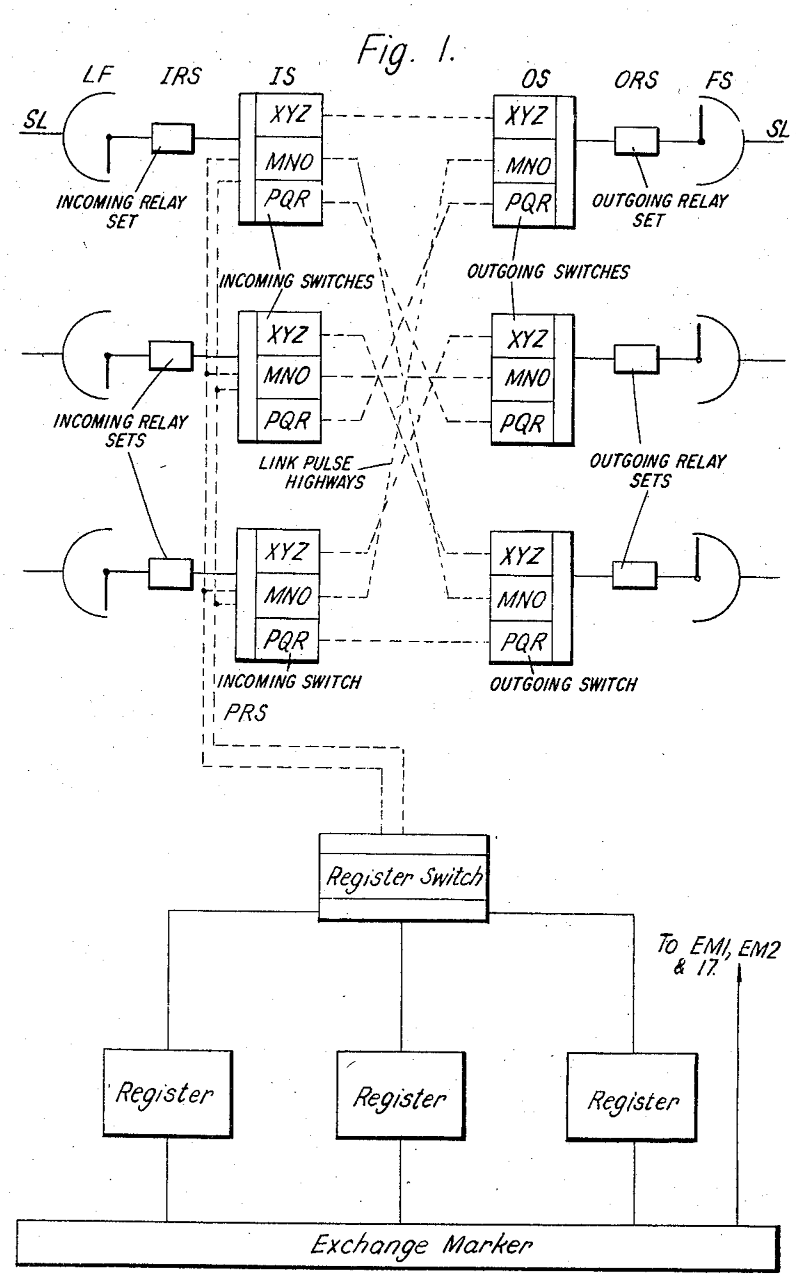

This invention relates to automatic telephone systems and more particularly to systems in which a connection is set up by electronic means.

In a telephone switching system in which connections through the exchange are completed on the so-called time division multiplex basis every line served by the exchange has to be provided with modulators and demodulators and at the present state of the art of electronic exchange switching the need for this equipment presents a grave economic disadvantage over existing electro-mechanical switching systems.

The present invention is directed to effecting a substantial reduction in the number of modulators and demodulators required in an exchange employing electronic switching.

In the present invention, electromechanically operated switches are used to effect connections between subscribers' lines and electronic switches, the subscribers' lines being connected to the banks of the electromechanically operated switches and the wiper sides of these switches being connected over audio-frequency trunks to electronic switches, and modulating and demodulating equipment is situated in the electronic switches terminating the trunks.

The number of trunks between an electromechanically operated switch and an electronic switch will be fewer in number than there are lines to be connected.

The electromechanically operated switches serve as line finders and final selectors respectively and are preferably quick acting switches of any suitable type, such as high speed motor driven uniselectors, cross bar switches or switches comprising selecting relays.

While there may be several ranks of electronic switches between the line finders and the final selectors, in practice there may be only two ranks of such switches, one rank connected to trunks from the line finders (incoming trunks) and one rank connected to trunks from the final selectors (outgoing trunks). In such a case the trunks may be connected to the selector sides of the electronic switches the bank sides of which are connected by pulse highways, there being a pulse highway from each switch in one rank to every switch in the other rank. Each pulse highway may have a group of pulses allocated to it and for the purpose of avoiding undesirable cross talk between circuits over a highway the pulses of a group may be arranged so that they are not adjacent in the time division multiplex cycle.

For the setting up of a connection in a system according to the invention, registers and a marker are provided, there being a group of registers available to the several trunks and a marker common to the group of registers. When a call is initiated, one of the registers is associated with the incoming electronic switch to which the incoming line has become connected and the called subscriber's number dialled by the caller is registered in the register which imparts the requisite routing information rapidly to the marker. The marker then brings about the marking of the called line and of free trunks over which access to the called line may be had and the setting up of a connection by means of the time division multiplex system between the register and an outgoing electronic switch which extends the connection over one of the marked trunks in the group of trunks connected to it. Associated with these trunks is a group of master selectors each of which has individual to it a coupling switch the contacts of which are connected to final selectors. Upon receipt of a signal over the selected trunk, a master selector is taken into use to mark both the final selector the wiper side of which is connected to the selected trunk and the outlet in the bank of this final selector to which the marked called line is connected whereupon the marker is released. The coupling switch sets the marked final selector to the marked called line and when the outgoing connection from the register to the called line is completed the register is released. There may be two different recurrent pulses in use, one for the connection between the incoming electronic switch and the register and the other for the connection between the register and the outgoing electronic switch. When the outgoing connection from the register has been completed the pulse employed on the incoming connection is removed and is substituted by the pulse used on the outgoing connection and when the register is released the pulse highway is swiched through using a single recurrent pulse. In the outgoing trunk an electronic device is operated consequent on the seizure of the trunk to bring about the application of ringing current to the called line as soon as connection to it has been made by the final selector and the presence of ringing current on the line opens a gate to admit the ringing tone to the outgoing trunk connected to the register by the outgoing electronic switch. The register responds to receipt of the ringing tone to initiate its release. A register backward hold signal derived when the register is taken into use operates an electronic device in the incoming trunk to prepare for metering. When the called subscriber replies, a gate is opened for the connection of a source of metering tone to the outgoing trunk and the tone is transmitted over the outgoing and incoming switches to the incoming trunk where it brings about the completion of the previously prepared circuit for the application of D.C. metering potential over the test wire in the line finder to operate the calling subscriber's meter. The system may also include arrangements by which if a P.G. condition or the equivalent obtains, the register, if still connected, is released and the calling line remains connected to the line finder but no starting signal is initiated to bring about a reconnection to a register.

Figure 2:
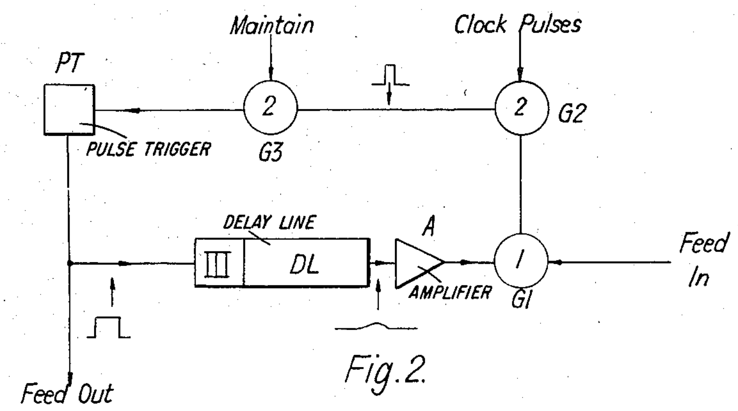
Figure 3:
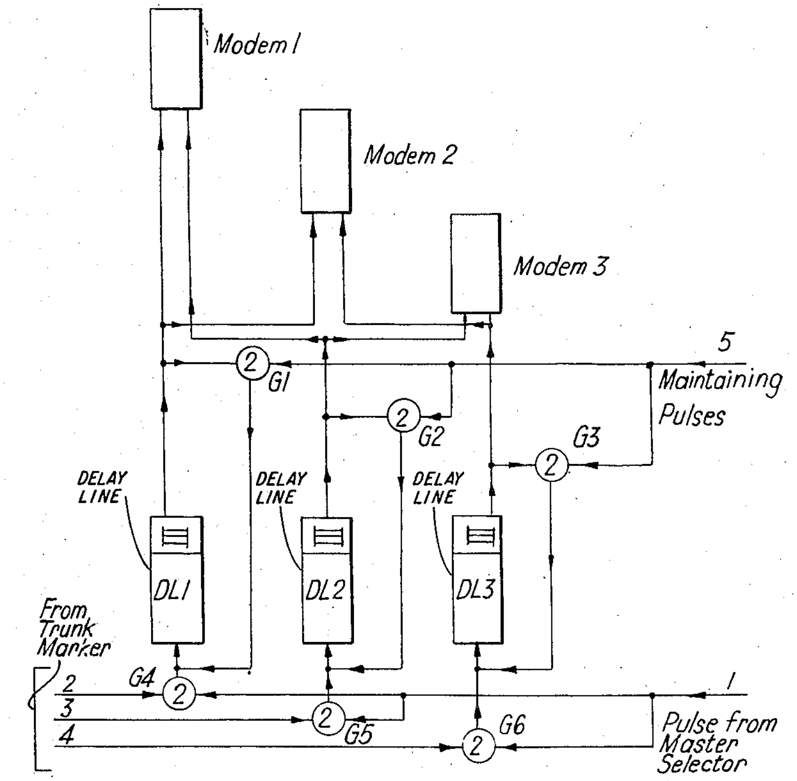
Figure 4:
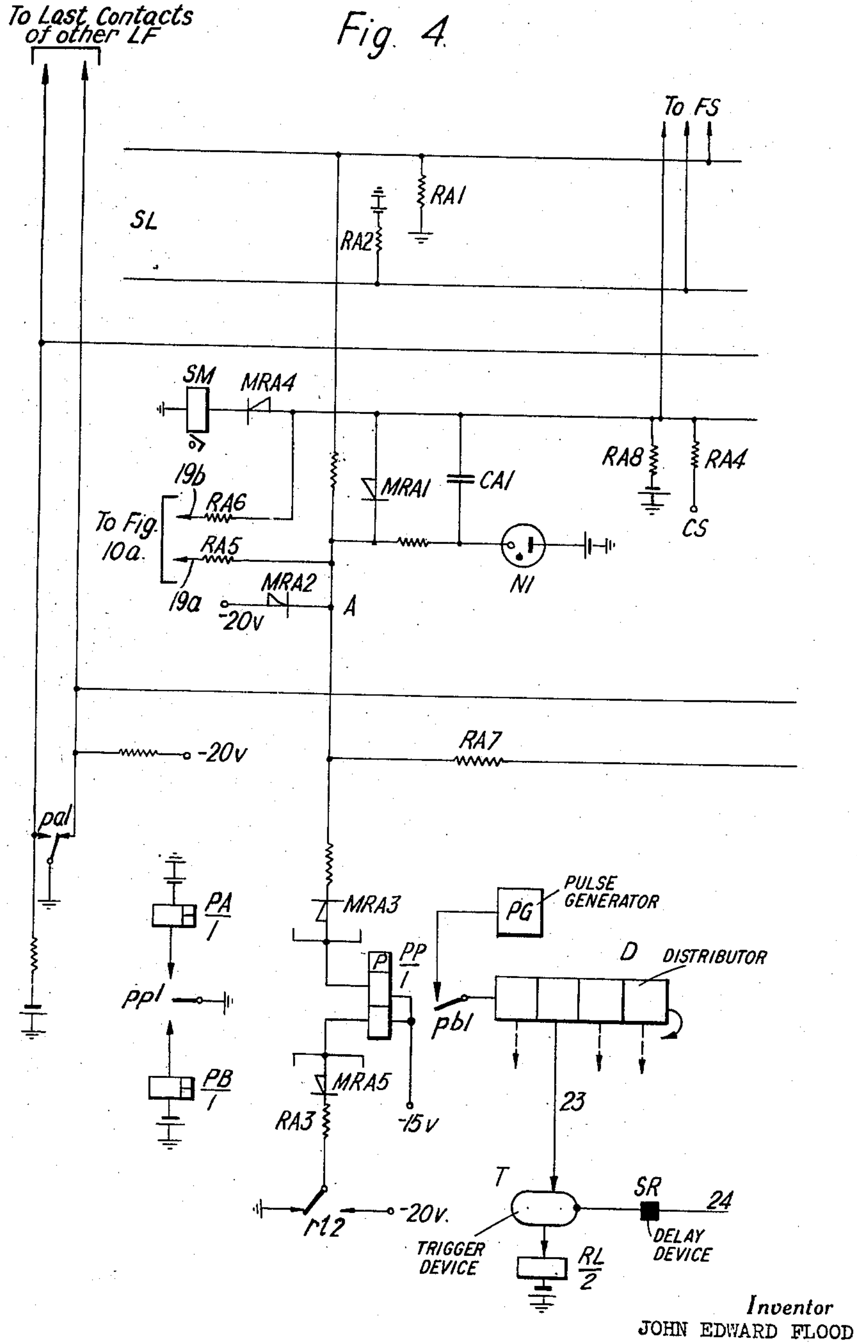
Figure 4A:
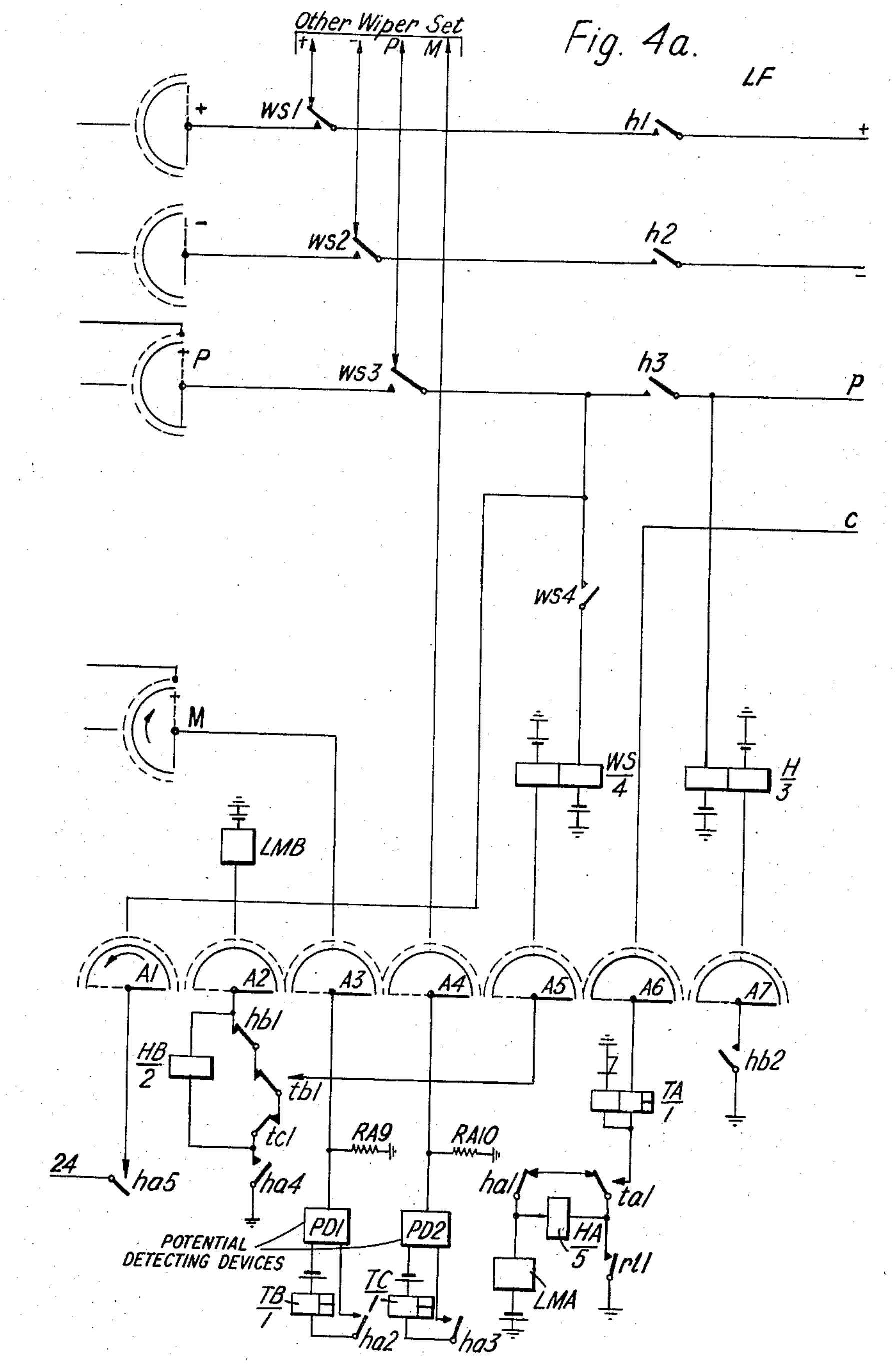
Figure 5:
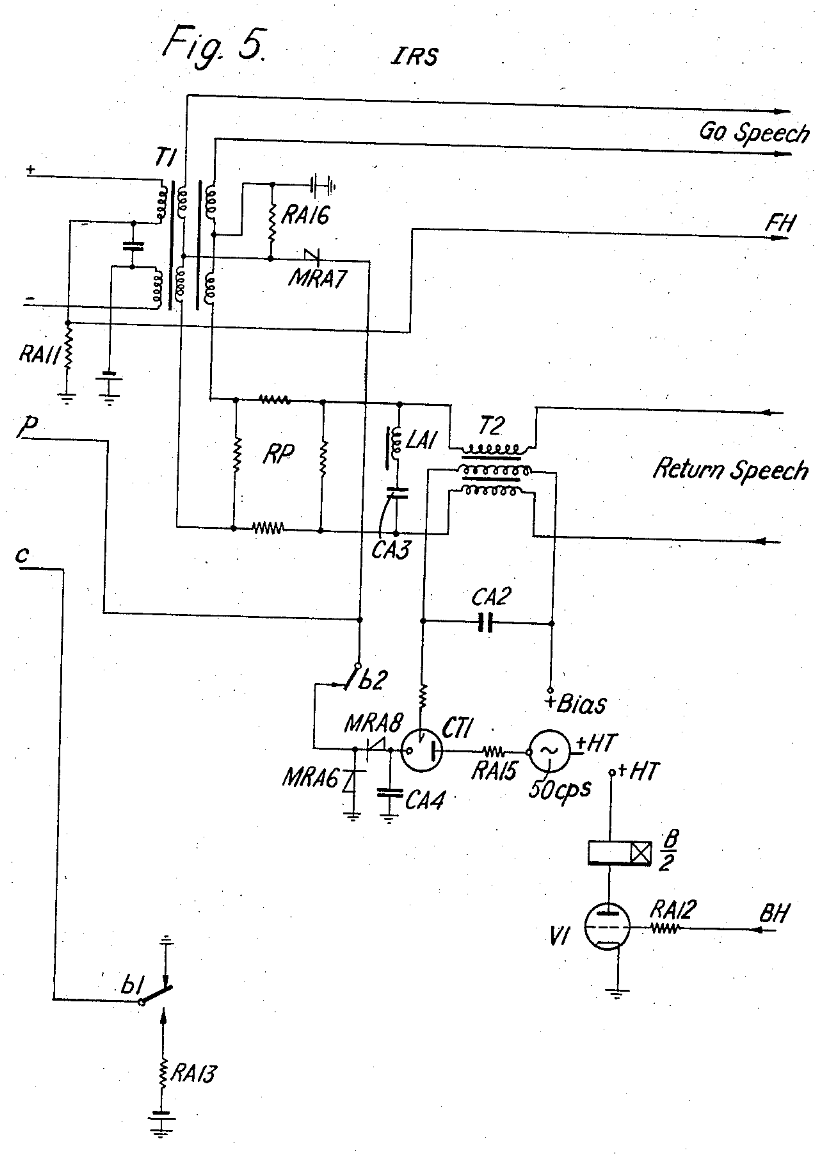
Figure 6:
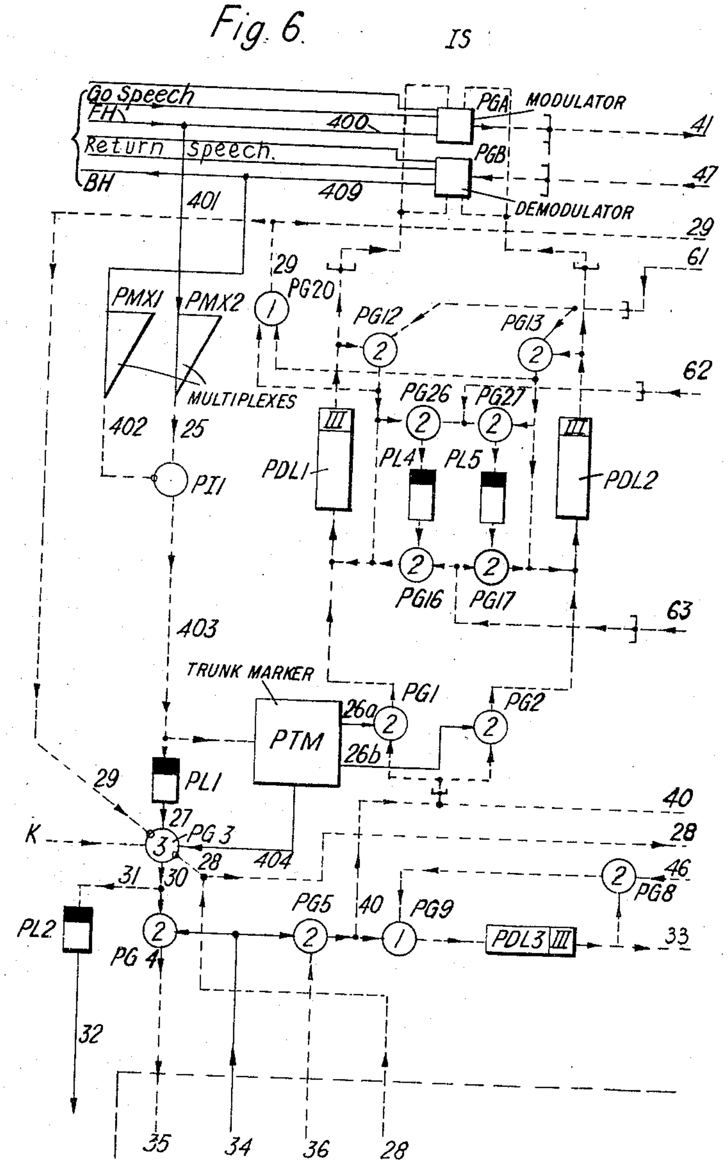
Figure 6A:
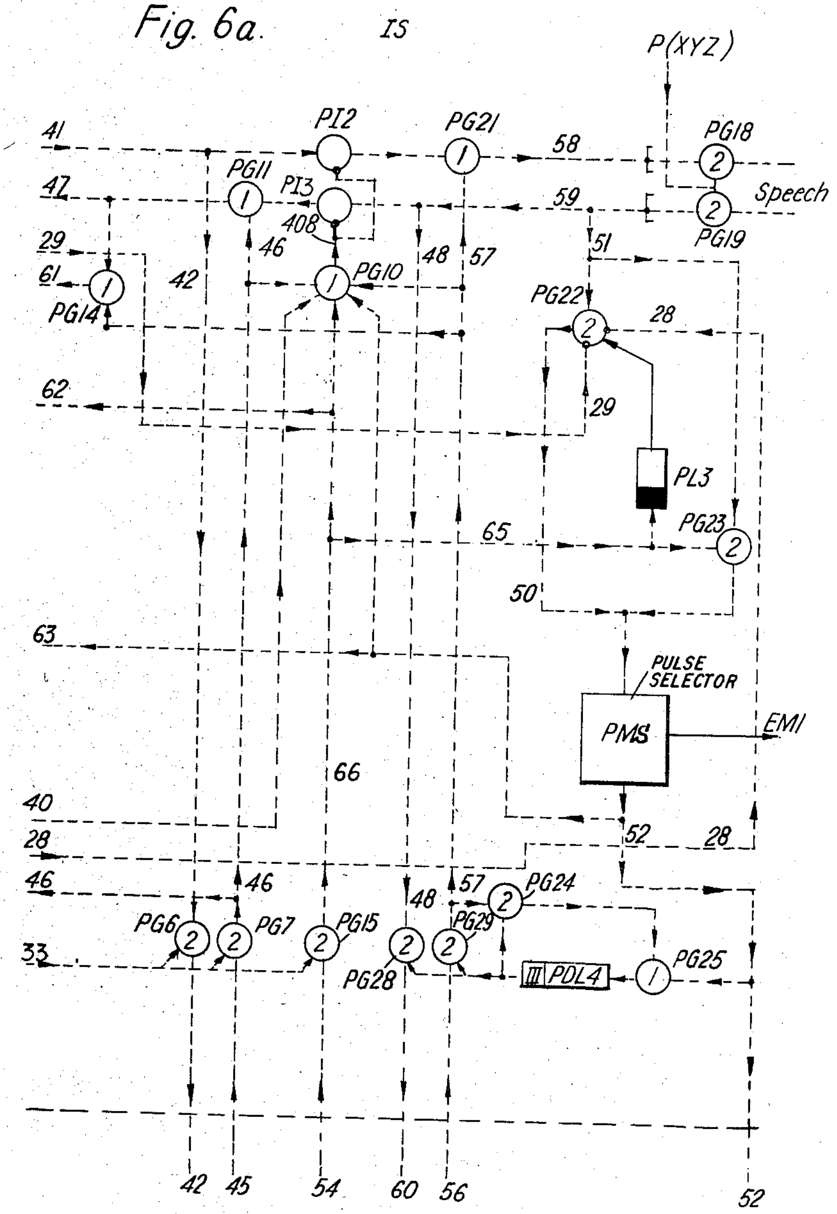
Figure 7:
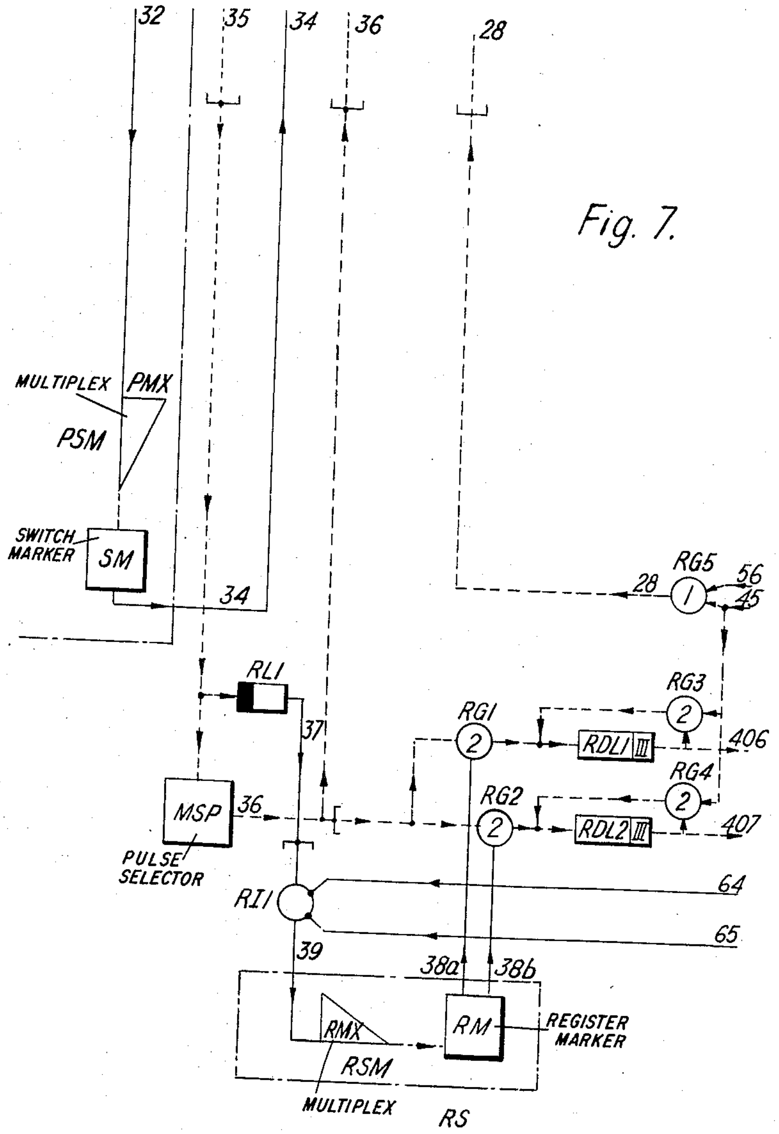
Figure 7A:
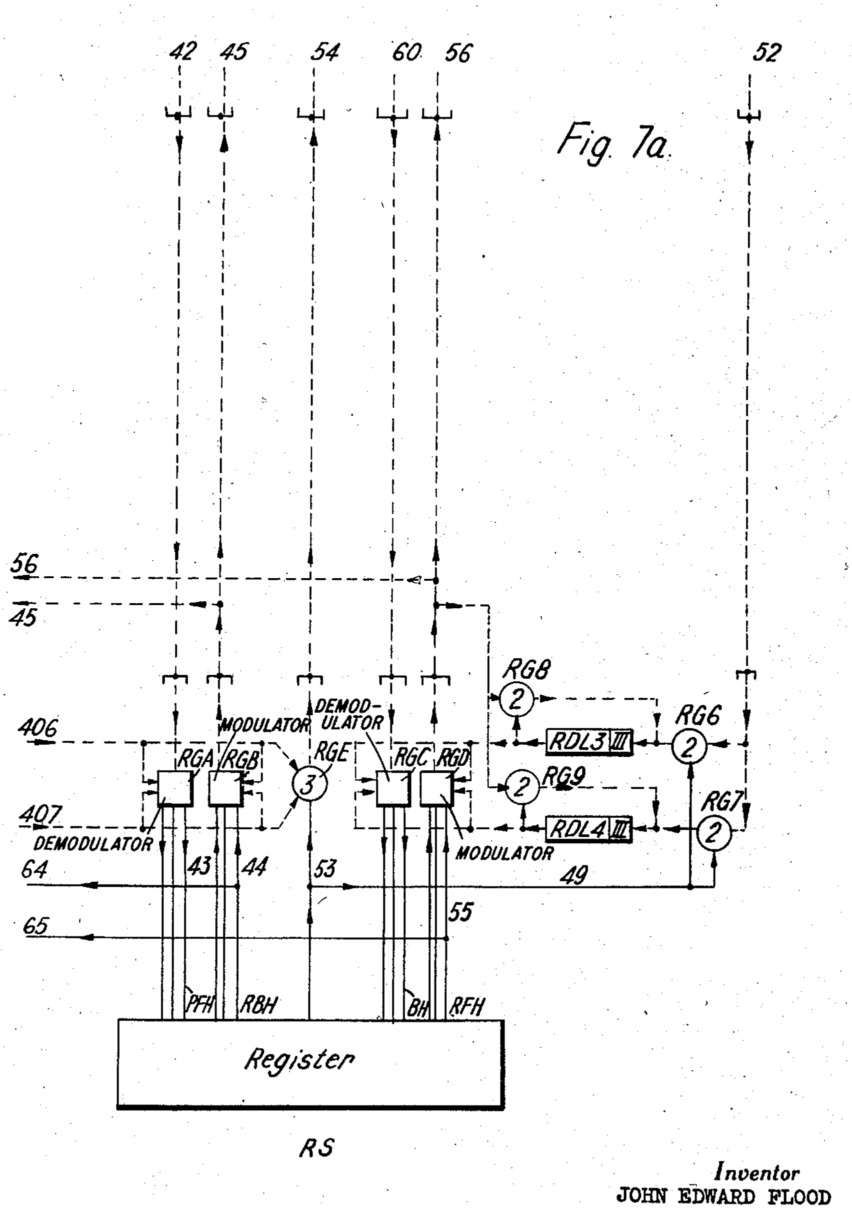
Figure 8:
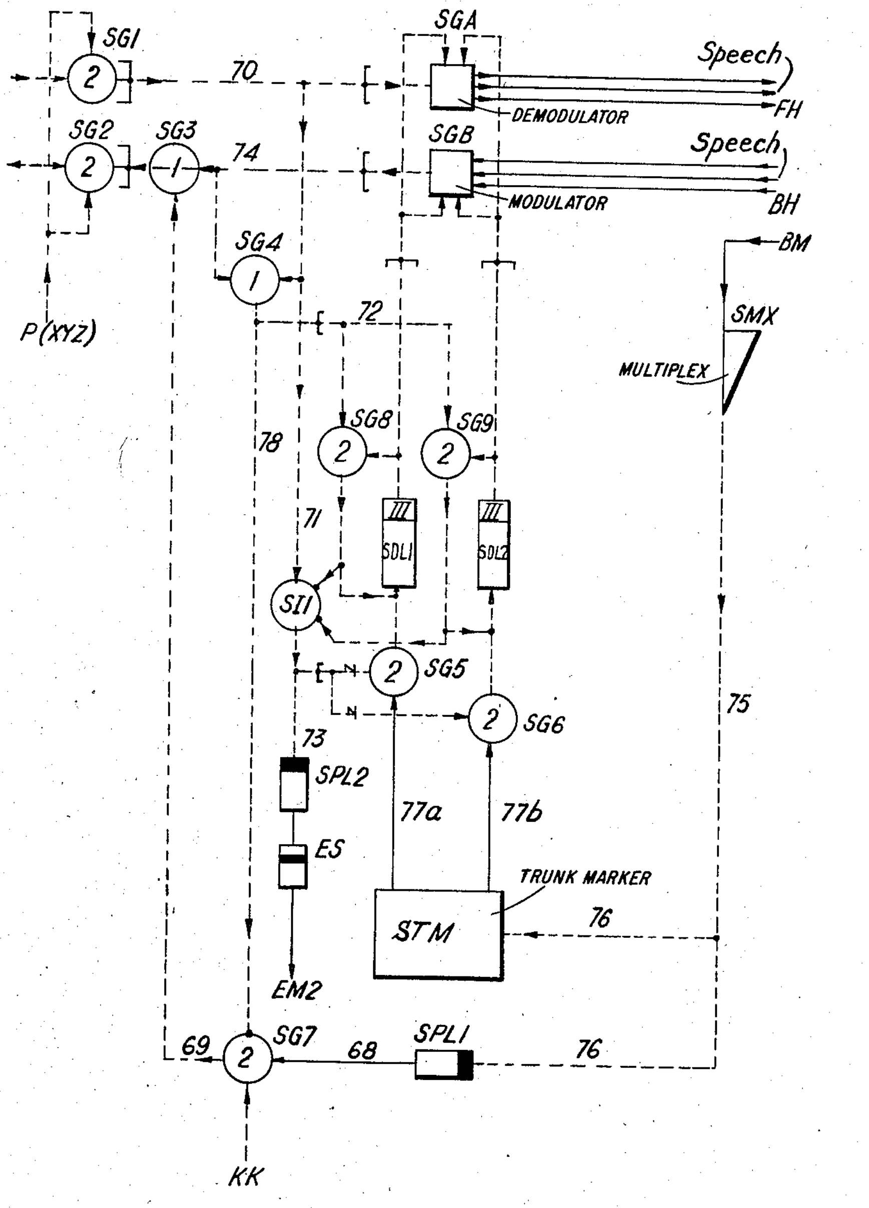
Figure 9:
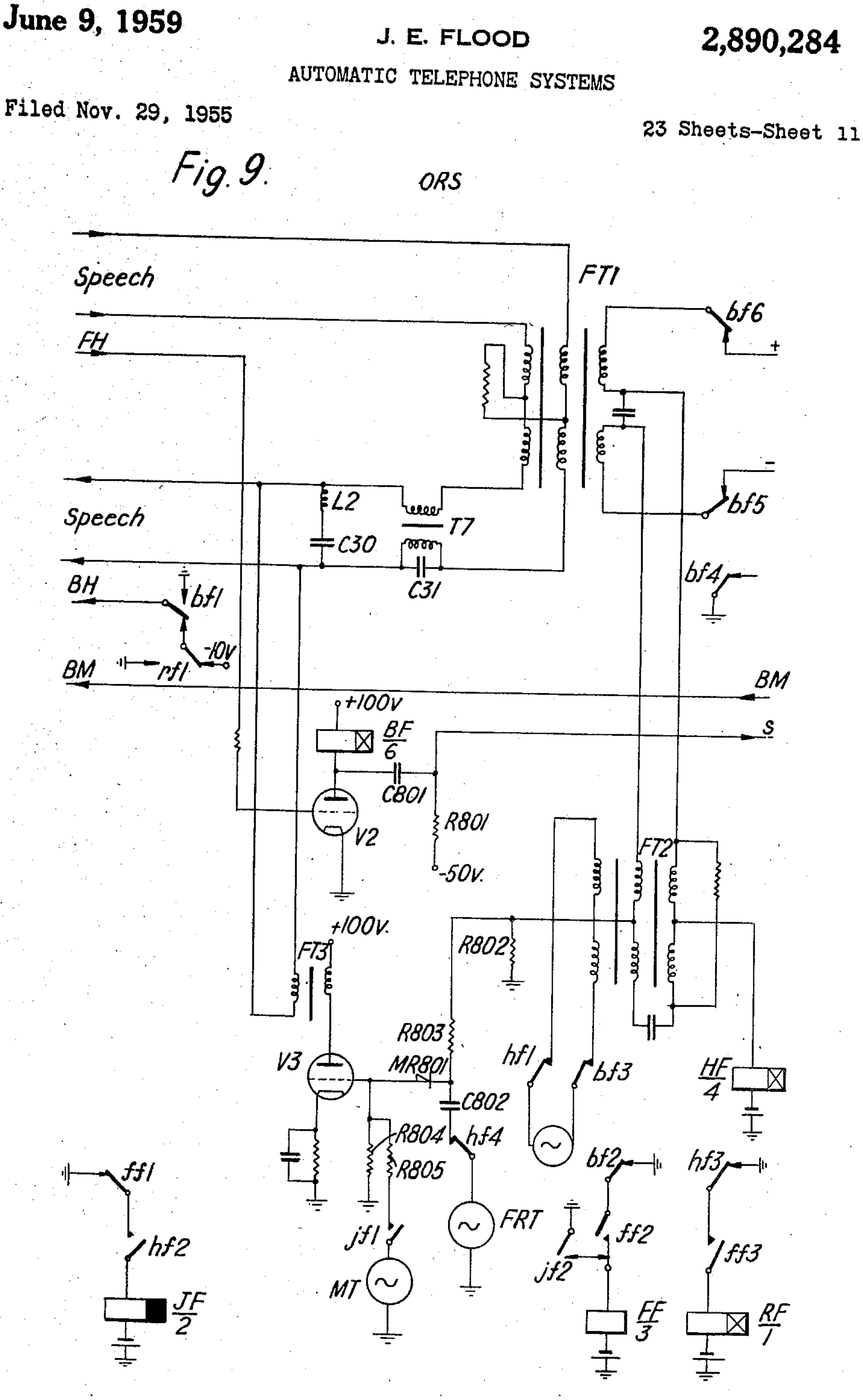
Figure 10:
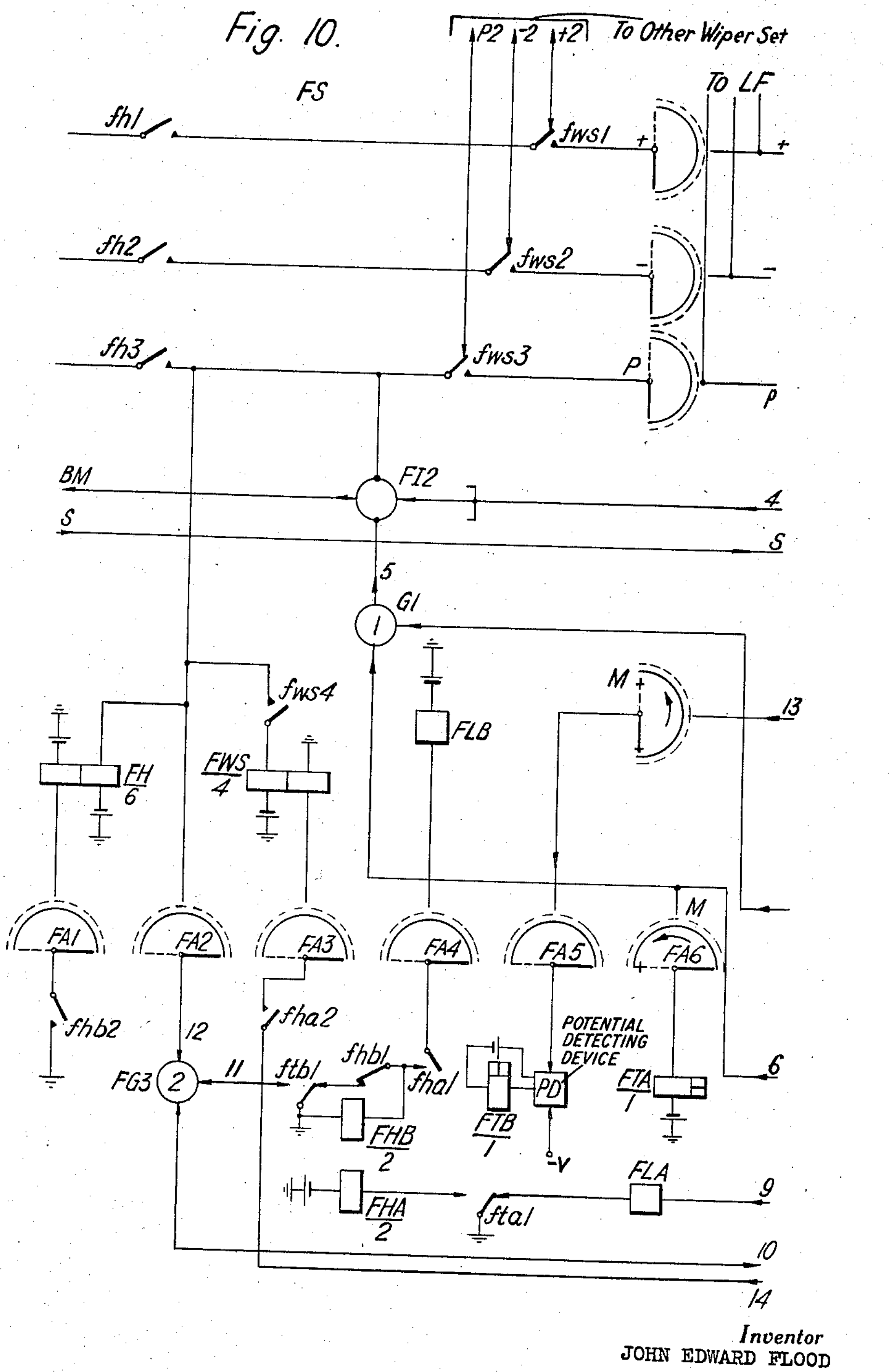
Figures 10A, 13:
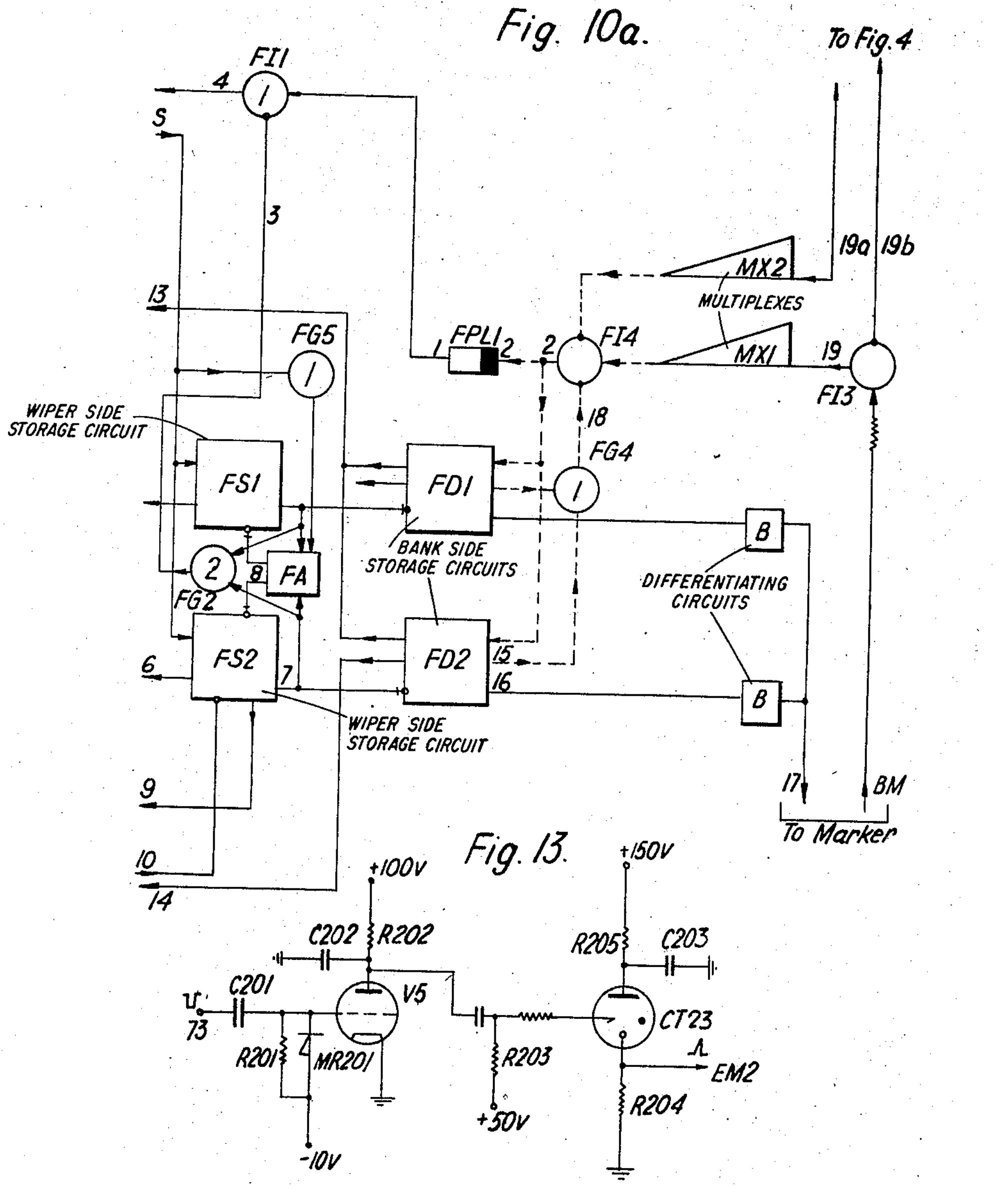
Figure 11:
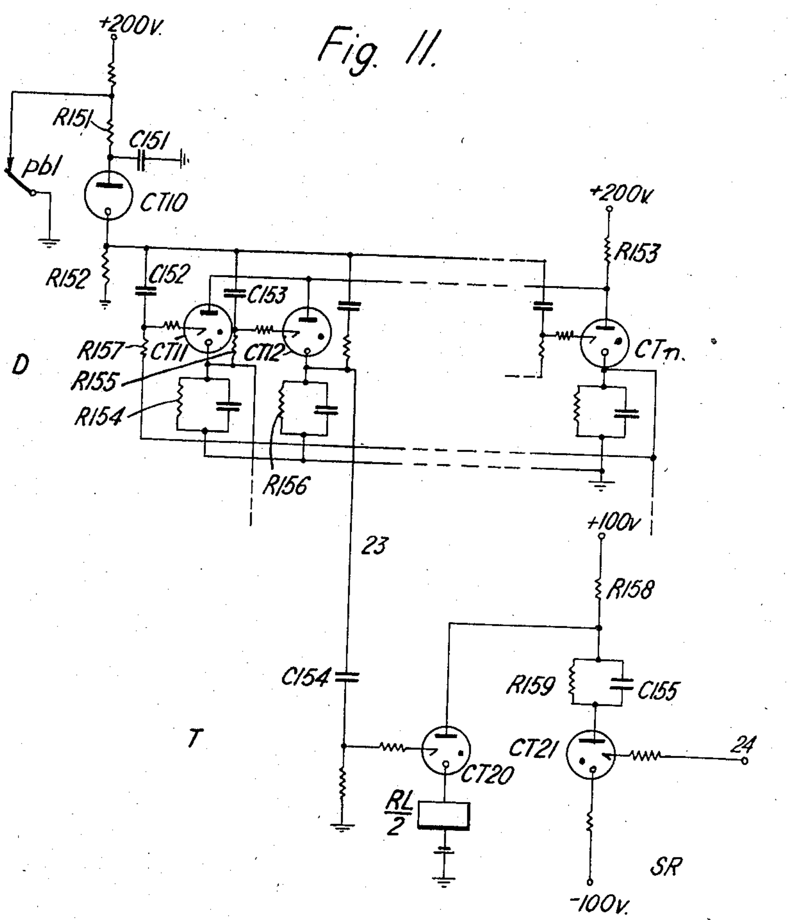
Figure 12:
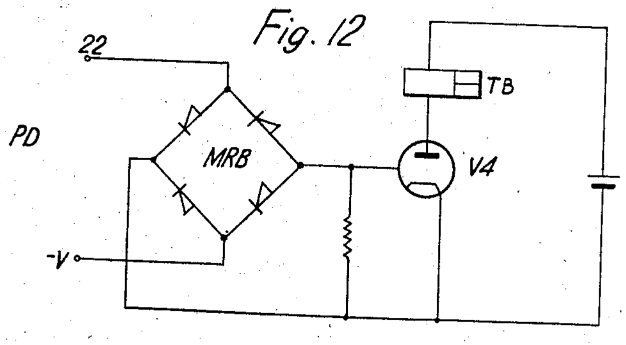

A preferred embodiment of the invention will now be described by way of example with reference to the accompanying drawings which show sufficient of the detailed arrangements in a telephone exchange for setting up a connection by electronic switches between line finders having access to incoming lines and final selectors having access to outgoing lines. The drawings comprise Figs. 1–29. Fig. 1 is a simplified trunking diagram of the exchange and Figs. 2 and 3 are schematic diagrams of the main elements comprising a delay line circulation system used for pulse storage in the electronic switches in the system. Figs. 4 and 4*a* show the circuits of an electromagnetically operated line finder and line finder allotter, Fig. 5 shows an incoming relay set connected between a line finder and an electronic incoming switch a functional diagram of which is shown in Figs. 6 and 6*a*. Figs. 7 and 7*a* together show a functional diagram of an electronic register switch for coupling a register when required to an incoming switch, Fig. 8 shows a functional diagram of an electronic outgoing switch, Fig. 9 shows an outgoing relay set connected between an electronic outgoing switch and a final selector and Figs. 10 and 10*a* show the circuits of an electromagnetically operated final selector with a semi-electronic control circuit. Figs. 4 to 10*a* should be assembled with Fig. 4 on the left and to the right of it in the order named Figs. 4*a*, 5, 6, 6*a*, 8, 9, 10 and 10*a*. Figs. 7 and 7*a* should be assembled below Figs. 6 and 6*a* respectively. Fig. 11 shows circuit details of the distributor and trigger device, included in the line finder allotter circuit, Fig. 12 shows circuit details of the potential detection device included in the line finder allotter circuit and the final selector control circuit and Fig. 13 shows details of two elements included in the outgoing switch. Figs. 14–20 are detailed circuit diagrams of electronic apparatus included in the speech path in the incoming switch, Figs. 21–25 are detailed circuit diagrams of the less obvious gates, pulse lengtheners, multiplexes, markers and selectors used in the electronic switches and Figs. 26–29 are detailed circuit diagrams of electronic apparatus included in the final selector control circuit.

For the purpose of setting up a connection within an exchange between line finders and final selectors, electronic switches of the kind in which communication through a switch is effected by the method of time division multiplex (TDM) are used. In one known system, such switches comprise a number of inlets and outlets linked by a single physical channel. This physical channel, commonly referred to as a "pulse highway," is allocated for the use of a particular inlet and outlet pair for a particular period of each time division multiplex cycle, each chosen pair being allocated a different period in the cycle. Speech communication between a chosen pair is achieved by modulation of the allocated time division multiplex pulse, pulse modulating and demodulating equipment (for brevity referred to hereinafter as modems) being included with each inlet and each outlet for this purpose. The modems associated with one side of an electronic switch such as outlined above (i.e. either the inlets or the outlets) are each permanently associated with a different one of the recurring TDM pulses, while the modems on the other side of the switch are provided with common control arrangements by means of which any modem can be associated with any one of the recurring TDM pulses providing it is free. The side of the switch the modems of which are permanently associated with the TDM pulses is known as the fixed pulse or bank side, while the side of the switch the modems of which can be associated with any TDM pulses is referred to as the variable pulse or selector side. In operation, a connection through the switch, for example from a selector side trunk to a particular bank side trunk, is effected by causing the common control equipment to select the TDM recurrent pulse coincident with that permanently applied to the modem associated with the bank side trunk and apply it to the modem associated with the selector side trunk so that these modems (one on each side of the switch) operate synchronously to transmit and receive modulated TDM pulses to and from the common pulse highway linking the two sets of modems on either side of the switch.

The above conceptions of an electronic selecting switch can be extended by keeping the TDM pulse trains in a common pool so to speak and allocating a free TDM pulse for the use of the modems of an inlet and outlet pair when required. Consequently, both sides of the switch become, in effect, selector sides.

In the present invention, the above conceptions of an electronic TDM switch with two selector sides is utilised, but the conception is restricted in that the two sides of the switch are, in effect, regarded as separate electronic unit switches, the bank side of a unit switch being the pulse highway. Further, by dividing the pulses of the TDM cycle into groups, the bank sides of the unit switches may comprise a number of pulse highways, one pulse highway being allocated for each pulse group. For the avoidance of excessive crosstalk due to the distortion of the pulses in transmission the pulse groups are arranged so that adjacent pulses in the cycle do not appear in a group. A number of unit switches may be formed in the manner indicated and used to provide adjacent switching ranks in a telephone exchange, the unit switches of a pair of switching ranks being arranged back-to-back, with their bank side pulse highways interconnected in such a way that each unit switch in one switching rank has access over interconnecting bank side pulse highways hereinafter termed link pulse highways, to every unit switch of the other rank and vice versa.

Referring now to Fig. 1 this shows a simplified trunking diagram of a telephone exchange switching system which comprises electromagnetic line finders and final selectors designated LF and FS respectively, intermediate electronic switching ranks designated IS and OS hereinafter referred to as incoming and outgoing switches respectively, and register switches with registers and a common exchange marker. The arrangement illustrated is suitable for a telephone exchange having a capacity of up to 5000 subscribers' lines, but it is to be understood that no limitation is implied by this exemplary arrangement. The selector sides of the incoming switches, indicated in the drawing by the single vertical panel, are connected over incoming relay sets IRS to line finders LF which have access to subscribers' lines. 250 trunks incoming from line finders may readily be accommodated on the selector side of each incoming switch IS, that is, the three incoming switches shown may be arranged to serve 750 line finders. The line finders are of the 200 outlet type and 200 subscribers may be served by 30 line finders. The three incoming switches shown thus accommodate 25 line finder groups providing a total capacity of 5000 subscribers' lines. The selector sides of the outgoing switches OS are similarly connected over outgoing relay sets ORS to final selectors having access to subscribers' lines SL. The final selectors are also of the 200 outlet type and the capacity of the outgoing switches is the same as that of the incoming switches. Assuming that the communication TDM system provides 99 channel pulses in each TDM cycle, each of the link pulse highways between the incoming and outgoing switches will provide 33 separate channels. Compared with a fully electronic exchange requiring at least one pair of modems for each subscriber (i.e. 10,000 in a 5000 line exchange), the above described arrangement requires only 1500 modems for 5000 subscribers showing a saving of modems of 85%. Each incoming switch has access over a common pulse highway PRS to a register switch which is common to all the incoming switches of a frame and which has access to a group of registers. The registers shown in the diagram have access to an exchange marker common to the exchange. The bank side of each of the incoming switches is linked by separate link pulse highways to the bank side of each outgoing switch and within each switch these link pulse highways are commoned through gate circuits to the pulse highway from the selector side of the switch. In the diagram, the gate circuits are represented by the rectangles XYZ, MNO, and PQR and the opening of each gate circuit is controlled by a group of TDM pulses so chosen that no group includes adjacent pulses in the TDM cycle.

In outline, the operation of the exchange system illustrated when a connection is to be set up between two subscribers connected to the same exchange is as follows. When a subscriber initiates a call, a line finder is allocated for use in the connection and hunts for the calling line and when it is found extends it over a trunk including the associated incoming relay set, to the incoming switch. A potential is generated in the incoming relay set and is applied as a forward hold signal to the incoming switch with which the line finder is associated and causes this switch to pass a switch calling signal together with all the TDM pulses not in use in the register or in the incoming switch concerned to a register switch. If more than one incoming switch has a calling line connected to it the register switch arbitrarily selects the one with which it will deal and also one of the free TDM recurrent pulses indicated to it from the selected incoming switch. The register switch then selects a free register and applies the selected TDM pulse to delay line storage circuits associated with both the calling trunk in the selected incoming switch and with the selected register. The selected TDM pulse circulates in these delay line storage circuits and controls the modems associated with the register and with the calling trunk. In this way a communication path is established between the calling line and a register. The register returns dialling tone to the calling subscriber who dials into the register by interruptions of the forward hold signal. The register stores the digital information, performs any translation required and applies for the use of the exchange marker. When the marker has received the routing information from the register it applies a so-called backward marking signal to the called line. This marking is extended over all free paths through final selectors and outgoing switches to the incoming switch to which the calling subscriber is connected whereupon one of these free paths is selected for the completion of the required connection.

The backward marking signal from the exchange marker causes all the pulses that may be used for effecting a connection from the incoming switch to appear at the incoming switch to which the calling subscriber has been connected and a selection of one of these pulses is made and the pulse stored in the delay line storage circuits associated with the calling trunk and with the outgoing side of the register. At the same time the selected recurrent pulse is transmitted as a forward hold signal over the link pulse highway to the outgoing switch from which it was originally received. At the outgoing switch receipt of the pulse brings about a connection of the outgoing switch to one of the marked outgoing trunks and transmits a backward hold signal over the link pulse highway to the incoming switch and the register and a connection between the register and the outgoing trunk from the outgoing switch is completed. The register is now connected to the incoming and outgoing trunks using different pulses but communication between the incoming and outgoing switches is inhibited.

In this embodiment, metering and ringing are controlled from the outgoing relay set. Simultaneously with the transmission of ringing current a ringing tone signal is returned in the direction of the calling subscriber. This signal is detected in the register and indicates that the called subscriber's line is not busy and the register knows thereby that it may release. In releasing, the register drops the TDM pulse used in the original connection between itself and the calling trunk and establishes a through communication path between the incoming and outgoing switches.

At the outgoing relay set the application of ringing current results in the transmission of an intermittent backward hold signal. When the called subscriber answers, metering tone is transmitted from the outgoing relay set to the incoming relay set and the calling subscriber's meter is operated from the incoming relay set. The backward hold signal thereupon becomes a steady signal and the pulse used for the connection remains stored in the delay lines associated with the calling trunk.

Before proceeding to describe the operation of the circuits illustrated reference will be made to the delay line storage circuits used in the system with reference to Figs. 2 and 3.

The delay lines used in the system of the present embodiment are of the ultrasonic liquid filled type. These usually comprise a steel tube filled with mercury with a quartz crystal transducer at each end. Such delay lines are now familiar to workers in many fields and particularly to those engaged on computor systems. The principle of operation of a delay line storage system is that if a pulse is applied at the transmitting end of a delay line, it will be reproduced at the receiving end after some delay and may therefore be considered as having been remembered for this time interval. If, as is usually the case, it is desired to remember the presence of the input pulse for a longer period, the output of the delay line can be fed back into the input so that the pulse circulates round the circuit and the period of memory is increased indefinitely. It is, of course, necessary to make up for any attenuation in the delay line, for example, by means of an external amplifier and to provide pulse re-shaping circuits so that the inevitable distortion of the pulse shape is corrected at every circulation.

The main elements which comprise a delay line circulation system are shown in Fig. 2. A pulse trigger PT applies a substantially rectangular pulse to the delay line DL. The output pulse from the delay line passes through an amplifier A to make up for the attenuation due to the delay line and is then applied to gate G2. Gate G2 is operated by a train of clock pulses the pulses of which are of short duration and coincide with the centre of each pulse from the output of the delay line thus causing gate G2 to produce a short output pulse, the timing of which is accurately determined by the short coincident clock pulse. The short output pulse from gate G2 triggers the pulse trigger PT which generates a longer rectangular pulse that is again fed into the delay line. In this way the circulation of the pulse is maintained, the pulse being retimed at gate G2 and reshaped by the pulse trigger each time it passes through the delay line. The pulse trigger which drives the delay line can also provide output pulses, thus indicating the pulses which are stored in the circulating system. Gate G1 is provided to enable additional pulses to be fed into the system. Gate G3 is provided to control the circulation. If gate G3 is open by the presence of a coincident pulse over the "maintain" lead at the time a pulse is applied to it, the pulse will pass through and thus continue circulating, but if this gate is closed due to the absence of a coincident pulse on the "maintain" lead, when a pulse is applied to it, the circulating path is broken and the pulse removed from storage.

Fuller details of a mercury delay line storage system as outlined above are contained in Paper No. 1527 of the Proceeding of the Institution of Electrical Engineers, Part II, Number 76, August 1953, entitled "The Mercury Delay-Line Storage System of the ACE Pilot Model Electronic Computer," by E. A. Newman, D. O. Clayden, and M. A. Wright.

In one known telephone system employing electronic selecting switches a delay line storage arrangement is associated with each trunk to remember the pulse to be used in the modulator-demodulator pair of the trunk. A more economical way of applying delay line storage is to associate a small comon group of delay lines with a large group of individual trunks. Each delay line can then use its full storage capacity (e.g. 100 pulses) instead of storing only a single pulse as in the said known arrangement. When a common store is used, the store has to remember not only the pulses in use but also with which trunk each pulse is associated. The method of doing this is shown in Fig. 3. In this figure each modulator-demodulator pair (modem) is arranged to operate only when it receives coincident pulses from the two delay lines to which it is connected and each modem is connected to a different pair of delay lines. Thus, a particular pulse will only operate the modem of trunk No. 1 if it is circulating in delay lines DL1 and DL2, a pulse will only operate the modem of trunk No. 2 if it is in delay lines DL1 and DL3 and it will only operate the modem of trunk No. 3 if it is in delay lines DL2 and DL3. When a pulse, selected by a master selector, is to be associated with a particular trunk, the trunk marker marks the two delay lines associated with that trunk. Thus, when the master selector generates on lead 1 a pulse which is to be associated with the modem of trunk No. 1, the trunk marker applies potentials to leads 2 and 3 to open gates G4 and G5 and admit the pulse to delay lines DL1 and DL2. The pulse will circulate in these delay lines for as long as the gates G1 and G2 are opened by a coincident pulse on lead 5. Lead 5 must therefore carry all the pulses to be kept in the store. This is arranged by connecting the lead to a common highway associated with the modems. Storage of the pulse associated with a trunk then depends on the presence of the forward or backward hold signal on the trunk.

The arrangements for retiming and reshaping the circulating pulses have been omitted from Fig. 3 and from the subsequent figures of the accompanying drawings. The simple example shown in Fig. 3 uses combinations of 2 out of 3 delay lines to store the pulses for 3 trunks and shows no economy over the use of delay lines individual to the trunks. However, for larger numbers of trunks a considerable economy is achieved. For example, 15 delay lines, used in pairs, can store the pulses for 105 trunks. If 15 delay lines are used in combinations of 3 they can store the pulses for 455 trunks.

Turning now to the more detailed circuits reference will first be had to Figs. 4 and 4*a*. The figures show a subscriber's line circuit and the circuits of a line finder and allotter for connecting a calling line over an incoming relay set to an electronic incoming switch. The line finder shown is a uniselector driven by an independent electric motor under the control of a latch magnet which when energised connects up the motor and removes a latch from the driving mechanism, but any other kind of electromechanical switch including a cross bar switch could be used. To stop the switch, the latch magnet is caused to release the latch and disconnect the motor. For the purpose of simplification of the drawing the driving mechanism is illustrated by the latch magnet. The allotter is a similarly driven switch. The line finder has sixteen wipers and arcs of contacts arranged in two sets of eight, and the wipers and contact arcs in each set of eight are paired, the wiper pairs being designated +, —, P and M, one set being shown on the drawing, the other set being connected to back contacts of a wiper switching relay WS as indicated. The wipers are arranged so that normally the wipers shown by full lines are standing on normal contacts at the beginning of the arcs shown in full lines and the wipers shown by broken lines are one step out of the contact bank so that when the first mentioned wipers are stepped off the last contacts in the full line arcs the second mentioned wipers are stepped on to the first contacts in the broken line arcs. The latch magnet representing the driving mechanism of the line finder is designated LMB. The line finder circuit includes, besides the wiper switching relay, the switching relay H. The allotter, which is also a uniselector of similar type has seven pairs of wipers designated A1 . . . A7 and associated bank contacts and the latch magnet representing the driving mechanism is designated LMA. The allotter circuit includes high speed test relay TA for testing the condition of line finders connected to its bank, high speed test relays TB and TC for testing lines encountered by the line finder in its search over one or other set of wipers, potential detecting devices PD1 and PD2 which serve to detect potential conditions indicative of free or busy line circuits and to bring about operation of the test relays TB or TC in response to the free potential and switching relays HA and HB. The circuit also includes a neutral polarised start relay PP, high speed relays PA and PB, an electronic distributor D, trigger device T, delay device SR and relay RL.

When a call is initiated by a subscriber, the line SL is looped and current flows over the loop from the 50 volt negative battery connected to the negative wire over resistor RA2 to earth over the resistor RA1. The drop in potential across resistor RA1 causes rectifier MRA2 to become conductive and the junction point indicated at A becomes held at a negative potential of 20 volts. Cold cathode tube N1 will not fire with this voltage on its cathode. The —20 volts potential at point A marks the line in the marking arcs of the line finders, in the line finder shown over resistor RA7 to the contact in the arc of wiper M. It also causes current to flow through the upper winding of the polarised relay PP which is connected to a source of —15 volts potential in a common starting circuit and over rectifier MRA3 individual to the calling line. If there is a free starting circuit relay PP will operate and its contact *pp*1 will be caused to complete a circuit for high speed relay PB. If there is no free starting circuit —20 volts potential will be applied over front contact *rl*2 as will shortly appear and relay PP will be operated over its lower winding, rectifier MRA5 and resistor RA3 individual to the starting circuit and its contact *pp*1 will be caused to complete a circuit for high speed relay PA. The negative potential at point A will also inhibit a pulse over resistor RA5 connected in the backward marking multiplex, Fig. 10*a* in order to busy the line to final selectors. It will first be assumed that a starting circuit is free and that relay PB has been operated. Contact *pb*1, which is shown diagrammatically in Fig. 4 as a make contact to indicate a circuit closure function, starts a pulse generator PG which generates pulses and transmits them to the distributor D which is stepped at approximately 10 steps per second. When a position is reached to which a free starting circuit is connected a pulse is transmitted from the distributor over wire 23 to the trigger device T to operate it. A cold cathode tube in the device T fires and operates relay RL. If the allotter wipers are resting on contacts of a free line finder relay TA will be operated over wiper A6 and wire *c* to negative battery. If the allotter wipers are resting on contacts of a busy line finder earth over contact *rl*1 will be connected over contacts *ta*1 and *ha*1 to latch magnet LMA of the allotter in the selected starting circuit and contact *rl*2 changes the potential over resistor RA3 on rectifier MRA5 from earth to —20 volts thereby energising the lower winding of relay PP. Contact *pp*1 is restored to its neutral position and relay PB is released. If, as may happen, a calling subscriber clears before his line has been seized by a line finder the number of calling lines will be less than the number of busy starting circuits, and current flow in the lower winding of relay PP will exceed that in its upper winding and relay PA will be operated. Contact *pa*1 changes the potential on the last contacts in the marking arcs M of the line finders from earth to —20 volts and earths the last contact in the test wire arcs P of the line finders. The first line finder to reach the last contact will be stopped thereon due to the presence of —20 volts on its marking wiper and the earth on the P wiper of this switch resets the trigger device T over wiper A1. Relay RL releases and at contact *rl*1 releases the control circuit and at contact *rl*2 restores relay PP to its balanced condition, whereupon relay PA is released. If the number of calling lines equals the number of busy starting circuits the contact of relay PP will remain in its neutral position and no further action will take place. If, now, another call is initiated and there is no starting circuit free relay PP will operate in the direction to operate relay PB and the distributor will be stepped and will continue to step until a starting circuit becomes free whereupon it will be seized by the distributor during its next counting cycle and relay PP will be restored to its neutral condition.

Continuing with the operations that take place on seizure of a free starting circuit, if the wipers of the allotters are not resting on contacts associated with a free line finder magnet LMA operates and the allotter is driven in search of a free line finder. Free line finders will be marked in the arc of wiper A6 of the allotter by the connection thereto of negative battery over wire *c* and busy line finders will be marked in this arc by the connection thereto of earth over wire *c*. The allotter will continue to rotate until contacts connected to a free line finder are encountered whereupon high speed first test relay TA will be operated over both its windings in series, wiper A6, wire *c* to negative battery. At its single contact *ta*1 a short circuit will be removed from relay HA and earth over contact *rl*1 will short circuit the left hand, higher resistance winding of relay TA to apply a low resistance earth on wire *c* to mark the line finder busy. Relay HA operates in series with magnet LMA but the resistance of the circuit is now too high to permit magnet LMA remaining operated and the magnet releases to stop the allotter. Contact *ha*1 opens a further point in the short circuit about the winding of relay HA to guard it against release of relay TA, contacts *ha*2 and *ha*3 connect high speed second test relays TB and TC respectively to potential detecting devices PD1 and PD2, contact *ha*4 connects earth over contacts *tc*1, *tb*1 and *hb*1 and wiper A2 to latch magnet LMB of the seized line finder and contact *ha*5 closes a circuit from earth on wire *p* over wiper A1 and the slow releasing device SR to reset the trigger device T. Magnet LMB operates and the line finder is driven in search of the calling line which will be marked in the arc of wiper M by −20 volts potential. When the line is found, according to the set of arcs of the line finder in which the calling line is connected relay TB or TC will be operated by the potential detected by the device PD1 or PD2 as the case may be consequent on the appearance of −20 volts on the arc of wipers A3 or A4. Resistors RA9 and RA10 are connected to the devices PD1 and PD2 respectively for the prevention of double connections. The resistances of these resistors are of such values that when two line finders have their wipers resting on commoned contacts in the arcs of wipers M the potential on those contacts is reduced to below −15 v. and neither device will operate. The devices PD1 and PD2 will be described more fully later with reference to Fig. 12. Contact *tb*1 or *tc*1 removes the short circuit from relay HB switching it into the circuit for magnet LMB and this magnet is released in a similar manner to that described for magnet LMA and the line finder is brought to rest. Relay HB operates. Contact *hb*1 opens a further point in the short circuit about the relay winding and contact *hb*2 operates relay H over wiper A7. Relay H operates and at its contacts *h*1–*h*3 extends the line and test circuits over the wipers of the line finder, contacts *ws*1–*ws*3 and wires +, − and *p* to the primary winding of the hybrid transformer T1 in the incoming relay set, Fig. 4. If relay TB is operated, earth over contacts *ha*4, *tc*1, *tb*1 and wiper A5 will be extended to relay WS and that relay will operate to perform a wiper switching operation and will lock up over contact *ws*4 to earth on wire *p*. Consequent on circuit changes that take place on extension of the calling line to the relay set which will be shortly be described, earth is connected to wires *p* and *c*. Earth on wire *c* releases relay TA by short circuit and earth on wire *p* holds relay H over its left hand winding and by extension over contact *h*3 holds relay WS and by extension over wiper A1 and wire 24 resets the trigger device T which in turn releases relay RL and decreases the current in the lower winding of relay PP. Contact *rl*1 opening releases relay HA which in turn releases relay HB at contact *ha*4. A further result of the earthing of wire *p* is to bring the potential of point A back to earth over rectifier MRA1 thus inhibiting the calling condition. It also inhibits the calling line in the backward marking multiplex over resistance RA6 to busy the line to final selectors. The subscriber's meter SM is operated in the normal manner by positive battery over wire *p*, line finder wiper P, rectifier MRA4, subscriber's meter SM to earth. At the end of the call and when the calling subscriber clears, earth is disconnected from wire *p* and relay H is released disconnecting the line finder from the incoming relay set.

When a connection is set up over the line finder, a tone denoting the class of service to which the line is entitled may be applied over wire *cs*, resistor RA4 and wire *p* and signalled to the register taken into use for setting up the connection.

Before proceeding further with the operations that take place in setting up a connection reference will be had to certain abnormal conditions that might arise. If a caller fails to dial or fails to clear after the called subscriber has cleared, the backward hold signal is removed and earth is disconnected from wire *p* and the line finder is released. A pulse of −50 volts over resistor RA8 and condenser CA1 is applied to the cathode of tube N1 which fires and causes point A to assume a potential between −10 and −15 volts. This potential is too positive to operate relay PP to give a starting signal but it suffices to inhibit the backward marking multiplex over resistor RA5. The line circuit remains in this condition until the caller clears. When this takes place point A resumes earth potential and the inhibition is removed.

When the line finder switches through, the calling line is connected to battery and earth over resistor RA11 and the primary winding of the hybrid transformer T1 in the incoming relay set shown in Fig. 5. The potential derived across resistor RA11 provides a forward hold signal over wire FH to the incoming switch which brings about the connection of a register to which the forward hold signal is extended and from which a backward hold signal is reverted. The backward hold signal reaches the incoming relay set over wire BH and is applied over resistor RA12 to the grid of the triode V1 as a potential of −10 volts. The triode, which has previously been in a conducting condition with its anode current holding relay B operated, now becomes non-conducting and relay B releases with a short delay. When the relay releases, contact *b*1 changes the potential of wire *c* from the line finder from −50 volts over resistor RA13 to direct earth and contact *b*2 connects earth over rectifier MRA6 to wire *p* from the line finder. These changes of potential bring about release of the common starting circuit and the holding of the line finder as previously described. The secondary windings of transformer T1 are connected to a four-wire speech circuit comprising "go" and "return" wires. Resistor RA16 provides a compromise balance for the average subscriber's line. If a tone denoting the class of service has been applied to the test wire in the line circuit it will be transmitted over rectifier MRA7 and the "go" path to the register, the tone being terminated by the connection of earth, over rectifier MRA6 and contact *b*2 to wire *p*, thereby biasing rectifier MRA7 into its non-conducting condition. Dialling tone is reverted from the register. Impulses from the caller's dial bring about changes of potential across the resistor RA11 which are repeated over wire FH to the incoming switch and thence as interruptions of forward hold pulses to the register which by this time will have been taken into use.

Inductance LA1 and capacitance CA3 form an acceptor type resonant circuit tuned to a frequency to be used for bringing about metering, e.g. 4.2 kc. p. s. and transformer T2 and capacitance CA2 form another resonant circuit tuned to the same frequency and a network of resistances designated by the general reference RP forms an attenuation pad which together with the resonant circuit LA1, CA3 prevents operation by speech imitation of this frequency by the caller, speech imitation by the called subscriber being taken care of in the outgoing relay set. The pad and circuit LA1, CA3, also reduce the amplitude of the metering frequency transferred by the transformer T1 to the calling line. When the metering frequency voltage applied in the outgoing relay set to the "return" wires is applied to the circuit T2, CA2, a resonance voltage is set up across capacitance CA2 and is applied over resistor RA14 to the trigger electrode of the cold cathode tube CT1. The anode of this tube is connected over resistor RA15 to a high tension source of HT voltage on which is superimposed an alternating voltage of 50 c.p.s. When the trigger potential becomes positive on receipt of the positive pulses of the metering signal during each positive half cycle of the 50 c.p.s. supply, the tube fires, while during each negative half cycle of the 50 c.p.s. supply the tube is extinguished. The condenser CA4 is charged each time the tube fires but the condenser is sufficiently large to prevent the cathode potential of the tube from falling during the times when the tube is extinguished and rectifier MRA8 remains in the low resistance condition and a steady current flows from condenser CA4 over rectifier MRA8, contact *b2* and wire *p* to operate the subscriber's meter.

At the end of the conversation when the caller clears the negative forward hold signal is removed and wire FH assumes earth potential and as a consequence the backward hold signal is removed from wire BH and the valve V1 conducts and relay B reoperates. Contact *b2* removes the holding earth from wire *p* and the line finder is released and contact *b1* restores the negative battery potential to wire *c*.

When the line finder has switched through a calling line there will be a "go" speech path and a "return" speech path connected to the hybrid transformer T1 and there will be a potential of −10 volts on wire FH. The "go" speech path and wire FH terminate in a modulating gate PGA and the "return" speech path and wire BH terminate in a demodulating gate PGB situated in the incoming switch (Fig. 6). There is thus a modulating gate and a demodulating gate for each trunk from the line finders, and each gate is thus available to any of the 200 lines served by the line finder. Each incoming switch includes a number of these gates connected individually on one side to line finder trunks and on the other side to a common pulse highway.

An incoming switch as illustrated in Figs. 6 and 6*a* includes, besides the modulating and demodulating gates PGA and PGB, multiplex circuits PMX1 and PMX2, a group of delay lines of which only two, designated PDL1 and PDL2 are shown and which serve to control the modems in the incoming switch. Two other delay lines designated PDL3 and PDL4 are also included and are associated with the pulse highways linking the incoming switch with the register switch. In addition, the incoming switch includes the trunk marker PTM, pulse selector PMS, admittance and coincidence gates PG1 to PG29, inhibiting gates PI1 to PI3 and pulse lengtheners PL1 to PL5. The register switch (Figs. 7 and 7*a*) includes multiplex circuits PMX and RMX, switch marker SM, pulse selector MSP, register marker RM, two groups of delay lines of which the two delay lines RDL1 and RDL2 belong to one group and the two delay lines RDL3 and RDL4 belong to the other group. A group of demodulating gates of which only the pair RGA and RGC are shown and a group of modulating gates of which only the pair RGB and RGD are shown, admittance and coincidence gates RG1 to RG9 and RGE, inhibiting gate RI1 and pulse lengthener RL1. For the identification of a line finder trunk served by the incoming switch an identification TDM system is provided. This identification TDM does not provide speech channels and a low recurrence frequency with a large number of pulses per cycle can be used. In the proposed arrangements the identification TDM cycle provides 250 separate pulses per cycle and a particular pulse in a cycle is permanently associated with a particular line finder trunk served by the switch. The identification TDM multiplex circuit is designated PMX2. It has a separate D.C. input wire corresponding to each line finder trunk. The multiplex has a single output pulse lead over which are passed the identification TDM pulses the time positions of which in the cycle correspond to the input wires upon which the forward hold signal is present. The gate PI1 inhibits passage of the pulses corresponding to busy trunks over lead 25 as will hereinafter be explained.

When a calling line is extended by a line finder to the incoming switch a forward hold signal will be present on wire FH and this prepares the modulator gate circuit PGA over lead 400 and is also extended over lead 401 to the multiplex circuit PMX2 which is thereby caused to generate the pulse corresponding to the line finder trunk over which the calling line has been extended and pass it over the output pulse lead 25. Should there be other calling lines extended by other line finders connected to the same incoming switch the identification pulses corresponding to these line finder trunks will also appear on the pulse lead 25. Pulses representing trunks already engaged will be inhibited by the presence at gate PI1 of the pulses generated by multiplex PMX1 over wire 402. The pulses on lead 25 that are not inhibited will pass through gate PI1 and be applied over lead 403 to the trunk marker PTM which has a single input lead and a plurality of pairs of output leads, one pair for each pair of delay line circuits in the group of delay lines serving this switch and is arranged to make a "one only" selection among the calling pulses applied to it over lead 403 and in response thereto to apply a D.C. marking potential to the pair of output leads corresponding to the pair of delay line circuits associated with the modems of the selected line, the D.C. markings being passed in this instance over the leads **26*a* and 26*b* to the "coincidence of two" gates PG1 and PG2. The presence of identification pulses on lead 403 also causes the pulse lengthener PL1 to operate and produce a D.C. potential on lead 27 which is connected to the "coincidence of three" gate PG3. This gate has also applied to it over wire K a train of clock pulses the pulses of which train coincide in turn with every pulse of the communication TDM system, a D.C. operating signal over lead 404 from the trunk marker PTM and over inhibiting leads 29 and 28 all the pulses that are already in use in the incoming switch and the register switch. The simultaneous presence of the clock pulses over wire K and of D.C. on leads 27 and 404 causes all the pulses suitable for providing a communication channel between the calling line and the register to appear on lead 30**.

The pulses on leads 30 and 31 operate the pulse lengthener PL2 which produces on its output lead 32 a D.C. potential which is applied to an incoming switch marking element PSM associated with the register switch of Figs. 7 and 7*a*. The marking element PSM comprises a multiplex PMX and a switch marker SM which has an input lead 405 and a plurality of output leads only one of which 34 is shown, there being one output lead corresponding to each pulse in the cycle of the multiplex PMX. The multiplex PMX has connected to it a lead, corresponding to lead 32, from each of the incoming switches served by the register switch and thus receives a calling signal from each incoming switch to which calling trunks are connected and which has available pulses, in the form of a D.C. potential on the appropriate leads corresponding to lead 32. Receipt of a D.C. marking potential over any of the leads like 32 causes the multiplex PMX to produce the corresponding pulses on its output pulse lead 405. The switch marker SM makes a "one only" selection among these pulses and applies a D.C. marking potential to the corresponding output lead 34 to mark the selected incoming switch.

Assuming that the incoming switch selected is that shown in Figs. 6 and 6*a*, the D.C. potential on lead 34 is applied to the "coincidence of two" gate circuits PG4 and PG5. This D.C. potential opens gate circuit PG4 and admits to lead 35 all the pulses which are not inhibited at gate circuit PG3. These pulses pass into the register switch to the pulse selector MSP which selects one of the pulses and reproduces the selected pulse on its output lead 36. The presence of pulses on lead 35 also operates the pulse lengthener circuit RL1 causing it to produce a D.C. potential on its output lead. This potential is fed, via lead 37 to inhibiting gate circuit RI1. There is one inhibiting gate circuit, such as RI1, for each register in the group of registers to which the register switch has access. Each inhibiting gate circuit RI1 is connected to its associated register, by two inhibiting leads such as 64 and 65 so that the D.C. marking potential from lead 37 is prevented from passing through those gates the associated registers of which are already engaged, but is allowed to pass through those gates the associated registers of which are free, and appears on the leads 39 from these gate circuits. The output leads 39 are connected to a register selecting circuit element RSM similar to the incoming switch marking element PSM previously mentioned, i.e. the output leads 39 feed into a multiplex circuit RMX the pulse output highway of which is connected to a register marker circuit RM. The application of marking potential to the leads 39 corresponding to the free registers results in pulses corresponding to these leads appearing on the output pulse highway from the multiplex RMX and the register marker circuit makes a "one only" selection among these pulses and produces a D.C. potential on a pair of output leads such as 38*a* and 38*b*, this D.C. potential being applied to the pair of delay lines corresponding to the selected register. The output leads 38*a* and 38*b* from the register marker RM are connected to gate circuits RG1 and RG2 respectively, thus opening these gates and allowing the selected pulse on lead 36 to pass into the pair of delay lines RDL1 and RDL2 associated with the selected free register.

The pulse on lead 36 also passes to the selected incoming switch where in the presence of the D.C. marking potential on lead 34 it passes through gate circuits PG5 and PG9 into the delay line PDL3 associated with the pulse highway between the register and the selected incoming switch. The same pulse also passes to the pair of delay lines PDL1 and PDL2 associated with the calling trunk via gate circuits PG1 and PG2, which are opened by the D.C. marking potentials on leads 26*a* and 26*b*, and also via lead 40 to the inhibiting gates PI2 and PI3 temporarily preventing any premature pulse from gate PGA passing over the link pulse highway. The coincident output pulses produced by delay lines PDL1 and PDL2 are applied to the pulse modulating and demodulating gate circuits PGA and PGB causing these to operate. The modulating gate circuit PGA is receiving the forward hold signal on lead 400 and this signal is therefore modulated by the gate circuit PGA thus causing a pulse coincident with that stored in the delay line pair to be produced on the pulse highway 41, and fed via lead 42 to gate circuit PG6. The pulse from the output of delay line PDL3 is also applied to gate PG6 via lead 33 and the coincidence of these two pulses at this gate opens it to allow the pulse on lead 42 to pass through to the register switch demodulating gate circuit RGA. Since gate RGA has applied to it the output pulses from the delay lines RDL1 and RDL2 via leads 406 and 407, the pulse on lead 42 is demodulated to reproduce the D.C. forward hold signal and apply it to the register over lead PFH. Upon receipt of the forward hold signal over lead PFH the register returns a D.C. backward hold signal over lead RBH, which is applied to the modulating gate RGB. This gate is also receiving the coincident pulses from the delay lines RDL1 and RDL2 and it therefore operates on receipt of the backward hold signal to produce on lead 45 a pulse corresponding to that on lead 42. The pulse on lead 45 opens the maintaining gates RG3 and RG4 to complete the circulation paths for the delay lines RDL1 and RDL2. The same pulse passes via gate RG5 and over inhibiting lead 28 to the gates PG3 (Fig. 6) in all the incoming switches associated with this register switch to mark the pulse engaged to other calling incoming switches. The pulse present on lead 45 is fed to gate PG7 and since this gate is receiving a coincident pulse from the delay line PDL3, the pulse passes through gate PG7 to lead 46. The presence of the pulse on lead 46 allows gate PG8 to open and complete the circulation path via gate PG9 for the pulse in the delay line PDL3. The pulse on lead 46 also passes to gate circuit PG10 which admits it to inhibiting lead 408 to inhibit the pulses at gates PI2 and PI3 preventing its reaching highways 58 and 59. The pulse on lead 46 is also admitted by gate circuit PG11 to the pulse highway lead 47 leading to the demodulating gate PGB. This pulse is also admitted by gate PG14 to lead 61 and is applied to gates PG12 and PG13 thereby opening these gates to complete the circulation paths for the pulse in delay lines PDL1 and PDL2.

The demodulating gate PGB operates on receipt of the pulse on lead 47 and produces on its output side on lead 409, a backward hold signal. This backward hold signal is applied to the identification multiplex PMX1 and causes it to generate on its pulse highway 402 the identification pulse corresponding to the calling subscriber. This identification pulse is applied to the inhibiting gate circuit PI1, thus closing the gate circuit to the identification pulse from PMX2 corresponding to the calling subscriber, and consequently this pulse is removed from lead 403. Removal of the pulse from lead 403 causes the trunk marker PTM to release thus removing the D.C. potentials from leads 26*a*, 26*b* and 404 which results in the closing of gate circuits PG1, PG2 and PG3. Closure of the gate circuit PG3 releases the pulse lengthener PL2 and removes the calling signal from lead 32 which in turn releases the incoming switch marking element PSM. This causes the D.C. potential to be removed from lead 34 and the absence of this potential closes gates PG4 and PG5. The pulse corresponding to the calling line from the "coincidence of three" gate PG3 is no longer present on leads 30 and 35, consequently the pulse selector MSP is released and the pulse lengthener RL1 no longer operates. As a result the selected pulse from MSP is removed from lead 36 and the register selecting circuit RSM is released. Release of RSM results in the removal of the D.C. potentials from leads 38*a* and 38*b* and this results in the closure of gate circuits RG1 and RG2. The selected communication pulse remains stored in the delay lines RDL1 and RDL2 associated with the selected register, in delay lines PDL1 and PDL2 associated with the calling subscriber's line, and in delay line PDL3 associated with the communication path between the selected incoming switch and the selected register, as long as the pulse is maintained on leads 45, 46 and 61 by the backward hold signal over lead RBH from the register, which in turn is dependent upon the continued receipt of the forward hold signal from the calling subscriber. As a result of the above described operations the communication path over leads 41, 47, 42 and 45 between the calling line and the incoming side of the register has now been completed and all the common apparatus, other than the delay lines used in setting up the path, has been released.

The register now transmits dial tone to the calling subscriber who dials the number of the wanted subscriber into the register, the loop interruptions caused by the subscriber's dial being repeated to the register as interruptions of the forward hold signal over wires FH and PFH. The register stores the digital information, performs any translations required and applies for the use of the exchange marker. As soon as the marker has become connected to the register, the register applies a D.C. "marker connected" signal to the lead 53 (Fig. 7*a*) and this signal is fed into gate RGE thus opening it and causing the pulse stored in delay lines RDL1 and RDL2 to be produced on lead 54, whence it passes to gate circuit PG15. This gate opens to it because of the coincident pulse applied to it by delay line PDL3, and the pulse is admitted to lead 66 whence it passes to leads 62 and 65. The pulse on lead 65 operates pulse lengthener PL3 thus producing a D.C. gating potential at gate PG22 and this pulse also passes over lead 62 to gates PG26 and PG27 and the same pulse is admitted by gate PG10 to the inhibiting gates PI2 and PI3 in the pulse highway to substantiate the pulse on lead 46. When the exchange marker has received the routing information from the register, it applies a backward marking signal to circuits (Fig. 10*a*) which bring about the marking of the called line and the extension of the backward marking signal over all free trunks between the group of final selectors having access to the called line and the corresponding outgoing switch (Fig. 8). In the outgoing switch, one of the free backwardly marked trunks is in effect appropriated for the call and, for the purpose of establishing a connection between the appropriated trunk and the incoming switch, the outgoing switch transmits over the link pulse highways to the incoming switches all the communication TDM pulses which are not already in use in the outgoing switch, and these pulses are distributed over the link pulse highways in accordance with the pulse group (XYZ, PQR, MNO) to which they belong. It will be assumed for purposes of explanation that the outgoing switch is connected to the calling incoming switch over the link pulse highway XYZ. The pulses of the group XYZ are admitted to lead 59 and thence over lead 51 to gates PG22 and PG23. The presence of D.C. potential produced by the pulse lengthener PL3 permits those pulses that are not in use in the incoming or register switches which would be inhibited over leads 28 and 29 to pass to the master selector PMS. The pulse used to connect the calling subscriber to the register, since this is a temporary connection, may also be used to effect connection to the outgoing switch, and if this pulse is among those received from the outgoing switch it is applied to gate circuit PG23 which opens in the presence of coincident pulses on lead 65 to allow the pulse to pass to the master selector. The master selector makes a selection of one of these pulses and reproduces this pulse on lead 52 and at the same time passes a D.C. signal over wire EM1 to the exchange marker to indicate that the master selector has completed its function. The selected pulse on lead 52 is passed over lead 63 to a group of delay line input gate circuits via a pair of which, e.g. gate circuits PG16 and PG17 it is stored in the same pair of delay lines as that in which the calling subscriber's pulse is already stored, e.g. delay lines PDL1 and PDL2. The gates PG16 and PG17 are opened by the receipt thereat of D.C. gating potentials from the outputs of the pulse lengthener circuits PL4 and PL5, the input pulses to which are received from the gate circuits PG26 and PG27 which in turn are opened by the coincident receipt of the calling subscriber's pulse already circulating in the delay line pair PDL1 and PDL2 and the same pulse which is applied to the gate circuits PG26 and PG27 from lead 62 via lead 66. The selected pulse on lead 63 is also fed via gate PG10 to the inhibiting gate circuits PI2 and PI3 to inhibit this pulse temporarily until a similar pulse is applied to the gates from the register. The selected pulse on lead 52 is also admitted by gate circuit PG25 to the delay line PDL4 and also to the group of gate circuits associated with the delay lines on the outgoing side of the registers. Due to the presence of the "marker connected" potential on lead 53 from the register in use on this call, the pair of gate circuits RG6 and RG7 associated with this register open on receipt of the selected pulse on lead 52 to allow this pulse to be stored in the delay line pair RDL3 and RDL4, which control the modem gate circuits RGC and RGD. The pulses which are received at the incoming switch via gate PG19 on lead 59 also pass over lead 48, gate PG28 which is opened by the coincident pulse previously stored in the delay line PDL4, lead 60, to the demodulating gate RGC which operates due to the presence of the coincident pulses from the delay lines RDL3 and RDL4 to produce a D.C. backward hold signal over wire BH to the register but this signal has no effect at the present time. At the time when the register applied a marker connected signal to lead 53, it also applied a register forward hold signal over lead 55 to the modulating gate RGD which now operates in the presence of the coincident pulses from delay lines RDL3 and RDL4 to reproduce the selected pulse train on lead 56. The pulse on lead 56 is fed to maintaining gates RG8 and RG9 to maintain the pulse in circulation in the delay lines RDL3 and RDL4 and is also admitted by the gate PG29 (Fig. 6*a*), which is opened by the coincident pulse from delay line PDL4, to lead 57. The pulse on lead 57 is fed to maintaining gate PG24 to maintain the pulse in delay line PDL4, and the same pulse is also fed via gate PG14 and lead 61 to the maintaining gates PG12 and PG13 to maintain this pulse in the delay lines PDL1 and PDL2. The pulse on lead 57 is also fed via gate PG21, pulse highway 58, the "XYZ" gate PG18 and the "XYZ" link pulse highway to the outgoing switch from which the pulse was originally received.

As will be later described in detail the receipt in the outgoing switch of the pulse transmitted over the "XYZ" link pulse highway causes the trunk previously appropriated for use on the call to be taken into use and a forward hold signal transmitted thereover. This forward hold signal is converted into a signal of short duration (hereinafter referred to as a setting signal) which serves to initiate the allocation and setting of a final selector to the outlet to the called line, and also to bring about the release of the common exchange marker.

On release of the exchange marker all backward marking signals are removed from the trunks to which they were applied. In the register release of the marker results in the removal of the marker connected signal from lead 53 and the pulse used in the setting up of the connection between the calling subscriber and the register is consequently removed from leads 54 and 66, and gates PG26 and PG27 are closed, bringing about the release of the pulse lengtheners PL4 and PL5 and the closure of the gates PG16 and PG17. In addition, the gate PG23 is closed and the pulse lengthener PL3 is released and gate PG22 is closed. The pulse which passed via lead 66 and gate PG10 to the inhibiting gates PI2 and PI3 is also removed but these latter gates remain closed by the inhibiting pulses over leads 46 and 57. A communication path has now been set up between the outgoing side of the register and the outgoing trunk and ringing tone when received over this path results in the release of the register. The register is also connected to the incoming trunk using the same or a different pulse train. The pulse train used for connecting the register to the outgoing trunk is also operating the gates of the incoming trunk but connection between the incoming and outgoing trunks is inhibited at gates PI2 and PI3. When the register receives the ringing tone signal from the outgoing relay set it releases by removing its forward and backward hold signals over leads RFH and RBH respectively. This removes the pulse used for the incoming connection from the delay lines PDL1, PDL2, PDL3 and RDL1 and RDL2 where it has been stored and removes the pulse used for the outgoing connection from the delay line PDL4 and RDL3 and RDL4. Removal of the pulses used for the incoming and outgoing connections from leads 46 and 57 results in the inhibition being removed from gates PI2 and PI3 and the pulse on lead 59 now passes through the gate PI3 to lead 47, whence it passes via gate PG14 to replace on lead 61 the pulse previously supplied from lead 57 to maintain the pulse in circulation in the delay line pair PDL1 and PDL2. Modulating and demodulating gates PGA and PGB are operated by the pulses circulating in the delay lines PDL1 and PDL2 to complete a through path from the incoming trunk.

It will be recalled that when the exchange marker is taken into use it applies a backward marking potential on lead BM (Fig. 10*a*) associated with the called line. Reference should now be had to Figs. 10 and 10*a* where it will be seen that the backward marking signal which is a potential of —20 volts on wire BM passes to the multiplex circuit MX1 via inhibiting gate FI3 and lead 19. If the called line is engaged in a set up connection, earth potential will be present at gate FI3 over the *p* wire and resistor RA6 (Fig. 4) and the backward marking signal will be prevented from reaching the multiplex circuit MX1. If the called line is in a calling condition the pulse associated with the line and generated by the multiplex MX2 will appear over lead 21 at inhibiting gate FI4 and the pulse generated by the multiplex MX1 will be inhibited at that gate.

The final selector is a uniselector driven by an individual electric motor and is similar to the line finder. It has two sets of negative and positive line and private wiper pairs and has one pair of marking wipers M which accommodate 100 marking outlets each of which corresponds to a pair of subscriber's lines outlets from the switch. For simplicity only one set of positive and negative line and private wiper pairs is shown in the drawing, and these are designated +, — and P respectively. The positive and negative line and private wipers of the other set are connected to back contacts of the wiper switching relay PWS as indicated. The final selector circuit includes a switching relay FH and a wiper switching relay FWS to enable either of the two sets of wipers to be used. The driving mechanism of the final selector is represented by the latch magnet FLB. The banks of the final selector are connected to line circuits in the usual manner.

The setting of a final selector is controlled by means of a master selector included in a common control circuit. Each of these master selector circuits has individual to it a coupling switch for coupling the master selector circuit to the individual circuit of any final selector if the group or groups served by the common control circuit in order to enable the final selector to be set under the control of the master selector circuit. The coupling switches are high speed motor driven uniselectors similar to the line finder and final selector switches. Only two master selectors are shown in the drawing but the number actually provided may be greater. The master selectors are similar and the connections of one are shown fully and it is to be understood that the other will be similarly connected. Wiper pairs FA1, FA2, FA3, FA4, FA5, FA6 are the wipers of the coupling switch pertaining to the master selector circuit which is fully represented in the drawing and the driving mechanism of the switch is represented by the latch magnet FLA. FTA is a high speed test relay for testing for a free final selector and FTB is a high speed test relay for testing for the called line connected to the final selector banks. FHA and FHB are switching relays and PD is a potential detecting device similar to those in the line finder allotter circuit.

Each master selector circuit includes two electronic storage circuits, a wiper side storage circuit and a bank side storage circuit, the terms wiper side and bank side relating to the final selector. In the drawing FS2 and FD2 represent respectively the wiper side and bank side storage circuits pertaining to the master selector circuit the connections of which are fully represented, while FS1 and FD1 represent the corresponding storage circuits pertaining to another master selector circuit. The wiper side storage circuit of a master selector circuit serves to record which particular final selector of the group is to be set under control of the master selector circuit in respect of a call. The bank side storage circuit of a master selector circuit serves to record, in respect of the call to which particular outlet the final selector concerned is to be set. The two storage circuits of the same kind are identical and for the purpose of description storage circuits FS2 and FD2 will be referred to. The storage circuits to be used are allotted by an allotter FA common to a group of trunks. Figs. 10 and 10*a* also show a pulse lengthener FPL1 for applying a D.C. backward marking signal to all free trunks, admittance and coincidence gates FG1–FG5, inhibiting gates FI1 and FI2 and the inhibiting gates FI3 and FI4 above mentioned. The detailed operation of all these devices will be described later with reference to Figs. 26 to 29.

As previously explained in connection with the incoming switch, one of the free backwardly marked trunks is taken into use at the outgoing switch and a setting signal is transmitted over it to bring about the setting of the final selector on which this trunk is terminated. The setting signal is a D.C. pulse transmitted over wire *s* of the selected trunk, there being one wire *s* individual to each trunk connected to the storage circuits FS1 and FS2, and via gate FG5 to the allotter FA. In the final selector control circuit the pulse over wire *s* passes to the wiper side storage circuit FS2, this being the storage circuit of the master selector under consideration and via gate FG5 to the alloter FA. The allotter has an allocation wire 8 for each master selector circuit and its function is to allot a free master selector circuit for use on the call. The storage circuit FS2 has an output marking wire 6 corresponding to each input wire and in response to receipt of a setting signal produces a steady marking condition on the output marking wire corresponding to the input wire over which the setting signal was received. Each output marking wire is connected in the bank of wiper FA6 to the particular contact corresponding to the final selector trunk that includes the wire *s* over which the setting signal was received. It is also connected via gate FG1 to inhibit the marking condition at gate FI2 of the trunk. The storage circuit also applies a steady setting signal over wire 7 to cause the corresponding bank side storage circuit, in the present example the circuit FD2, to operate, and over a branch of the same wire to the allotter FA to busy the allotted master selector therein and over another branch of the same wire to gate FG2 which opens when all the master selectors are busy to inhibit the backward marking signal on all the trunks at gate FI1. In addition, storage circuit FS2 applies potential to wire 9 for the operation of latch magnet FLA of the coupling switch, the circuit being completed over contact *fta*1 to earth.

The bank side storage circuit FD2 has an input wire as a branch of the pulse lead 2 from gate FI4 and output marking wires such as 13 individual to each of 100 pairs of subscribers' lines. In response to a pulse on lead 2 the storage circuit applies a D.C. marking potential on the marking wire corresponding to the pair of subscribers' lines to one of which the pulse corresponds. The output marking wire 13 is connected in the arc of wiper M of the final selector in a position corresponding to the line marked by the exchange marker. The D.C. marking potential is different for each master selector circuit associated with the common control circuit and for discrimination purposes in the control circuit the potential detecting device PD is provided. The storage circuit FD2 in response to the input pulse also applies a battery potential to wire 14 if the marked line is one for which wiper switching in the final selector will be required, wire 14 being connected over contact *fha*2 of switching relay FHA and wiper FA3 to an earthed winding of the wiper switching relay FWS. The storage circuit is also connected over wire 16 and a differentiating circuit B individual to the storage circuit to a common wire 17 over which a fleeting signal is transmitted to the exchange marker to indicate that the final selector has been set to the contacts of the called line. This signal together with similar signals from the incoming and outgoing switches results in the release of the exchange marker.

The operations that take place if the called line is free will now be described in further detail. Multiplex circuit MX1 generates the pulse corresponding to the called line and this pulse not being inhibited at gate FI4 passes over leads 20 and 2 to pulse lengthener FPL1 and to storage circuit FD2. The pulse lengthener produces a D.C. potential on lead 1 to inhibiting gate FI1 which will be open so long as there is a free master selector circuit. Assuming this to be the case, the D.C. potential on wire 1 as a backward marking signal is extended via gate FI1 to the backward marking wires in all free outgoing trunks. The signal will be inhibited at gate FI2 from all busy trunks by reason of earth potential over wire *p* of these trunks or via gate FG1 as previously mentioned. The storage circuit, in response to the pulse received over lead 2 applies a D.C. marking potential to the corresponding wire 13 to mark the called line in the marking arc M of the final selector and to bring about ultimately the operation of the wiper switching relay over wire 14 if necessary. The storage circuit FS2 in response to the setting signal over wire *s* operates latch magnet FLA over wire 6 to bring about search by the coupling switch for the final selector connected to the appropriated outgoing trunk and marks the appropriated trunk in the marking arc of wiper FA6 of the coupling switch over wire 6 and extends this marking via gate FG1 to gate FI2 as previously mentioned. It also transmits a signal over wire 7 to the storage circuit FD2 to cause it to respond to the pulse received over wire 2. When magnet FLA operates the coupling switch is driven in search of the marked final selector and when wiper FA6 encounters the marked contact relay FTA operates and at contact *fta*1 disconnects the latch magnet, releasing it to stop the switch and operates relay FHA. Contact *fha*1 connects earth over contacts *ftb*1, *fhb*1 and wiper FA4 to magnet FLB of the selected final selector which on operation causes the final selector to drive in search of the line marked in the arc of its wiper M over wire 13. When the marked contact in the arc of wiper M is reached relay FTB will operate and at contact *ftb*1 will switch relay FHB in series with magnet FLB and apply earth over wire 11 to gate FG3. Magnet FLB will not hold in series with relay FHB and will release to stop the selector. Contact *fhb*1 opens against the eventual release of relay FTB and contact *fhb*2 operates relay FH over wiper FA1. Contact *fha*2 prepared a circuit over wiper FA3 for relay FWS if the setting of the storage circuit FD2 determined this to be necessary. When relay FH operates, contacts *fh*1, *fh*2 and *fh*3 extend the +, — and *p* wires to the outgoing relay set. Relay FWS, if operated, performs a wiper switching operation at its contacts *fws*1, *fws*2 and *fws*3 and at contact *fws*4 holds relay FWS to wire *p*. Consequent on the extension of earth on wire *p* over contact *fh*3 and wiper FA2 and on the application of earth over contact *ftb*1 gate FG3 opens and earth potential is extended over wire 10 to bring about the release of the master selector. On the release of the master selector earth is removed from wire 6 releasing relay FTA and removing the control circuit inhibition at gate FI2. Release of relay FTA releases relay FHA which in turn releases relay FHB. Relay FTB has been released by the release of the master selector and the control circuit is restored to its normal condition. The called line has now been connected back over the final selector wipers to the primary winding of hybrid coil FT1 in the outgoing relay set.

When the forward marking signal, which is a potential of —10 v., from the register to the outgoing switch is extended to the trunk appropriated for the call, relay BF (Fig. 9) which is normally operated is released, its release being delayed slightly by means of its slug, and condenser C801 becomes charged in series with resistor R801 and a positive D.C. pulse is transmitted over wire *s* to the master selector as previously mentioned. The circuit operations will now be continued with reference to Fig. 9. This figure shows the circuits of an outgoing relay set which includes hybrid transformer FT1, ringing current hybrid transformer FT2 and tone transformer FT3. The circuit also includes thermionic valves V2 and V3 and relays FF, HF, JF and RF. As before mentioned, receipt of the forward hold signal releases relay BF which at contact *bf*1 replaces earth on the backward hold wire BH by —10 v. potential, at contact *bf*2 prepares a holding circuit for relay FF, at contact *bf*3 connects the source of ringing current to the left hand windings of transformer FT2, at contact *bf*4 earths wire *p* and at contacts *bf*5 and *bf*6 connects the + and — wires of the final selector to the primary winding of transformer FT1. Ringing current is applied via transformer FT2 to the called line and the presence of the called subscriber's bell circuit across the line unbalances transformer FT2 and causes the ringing current to give rise to an interrupted potential across resistor R802. Relay HF is unaffected because it is slow to operate. The interrupted potential developed across resistor R802 opens the rectifier gate comprising rectifier MR801 resistors R803 and R804 and condenser C802 which is fed with continuous ringing tone from the source FRT. This tone is applied to the grid of valve V3 and is repeated in the valve anode circuit over transformer FT3 and the speech path to the gate SGB in the outgoing switch where it modulates the pulse fed to that gate to repeat the tone over the pulse highway to the register and via the incoming switch to the calling subscriber. Receipt of ringing tone at the register brings about the release of the register and the forward hold signal is maintained from the incoming switch so long as the calling subscriber remains connected to it. When the called subscriber answers, relay HF is operated from earth over resistor R802 and the called loop and at contact *hf*1 trips the ringing. Contact *hf*2 operates slow-to-operate relay JF, contact *hf*3 opens in the circuit for relay RF and contact *hf*4 disconnects ringing tone from the grid of valve V3. Operation of relay JF applies a source of metering tone MT over contact *jf*1 and resistor R805 to the grid of valve V3 to repeat the tone to the calling line circuit over transformer FT3 for bringing about the operation of the calling subscriber's meter and at contact *jf*2 operates relay FF. Relay FF locks up over contacts *ff*2 and *bf*2 and releases relay JF at contact *ff*1. Relay JF releasing, the metering tone over transformer FT3 is cut off. Across the speech path towards the called subscriber is an acceptor circuit comprising the inductance FL and capacitance FC tuned to the metering tone frequency to serve as a low impedance shunt to this frequency across this speech path. A filter comprising inductances FL1 and FL2 and capacitance FC1 is included in the speech path to prevent speech imitation of the meter tone signal. At the end of the conversation when the calling subscriber clears the forward hold signal is removed and the potential of the grid of valve V2 rises causing anode current to flow for the reoperation of relay BF. When this relay operates the backward hold signal is removed from wire BH at contact *bf*1, relay FF is released at contact *bf*2, relay HF is released by the opening of contacts *bf*5 and *bf*6 which open the called loop and ringing current is kept off the transformer FT2 at contact *bf*3. Contact *bf*4 disconnects earth from the *p* wire to release the final selector. Should the called subscriber clear first relay HF will be released by the opening of the called loop and at contact *hf*3 will operate relay RF over contact *ff*3. Relay RF is slow to operate and when it operates, contact *rf*1 will remove the backward hold signal over wire BH to bring about operations described earlier in connection with the line finder.

The circuits of the outgoing switch shown in Fig. 8 will now be described. The switch circuits include demodulating gates such as SGA and modulating gates such as SGB, multiplex circuit SMX, trunk marker STM, pairs of delay lines, one pair of which is shown at SDL1 and SDL2, all the pairs being connected in common to the modulating and demodulating gates, pulse lengtheners SPL1 and SPL2, admittance and coincidence gates SG1–SG9, inhibiting gate SI1 and a circuit ES the purpose of which will be apparent later. The backward marking wires of trunks to final selectors served by this outgoing switch are connected to the multiplex circuit SMX and the marking of the free trunks in the final selector group concerned causes the multiplex SMX to generate pulses corresponding to these marked trunks and produce them on lead 75 and pass them to leads 76 to the pulse lengthener SPL1 and trunk marker STM. Pulse lengthener SPL1 produces on lead 68 a D.C. potential to operate gate SG7. This latter gate is also fed with a train of clock pulses over wire KK which coincide in turn with every pulse in the cycle of communication TDM pulses. All the communication pulses that are already in use in the outgoing switch are applied over inhibiting lead 78 to gate SG7 which therefore allows only the communication pulses that are free to appear on lead 69. These free pulses are admitted by gate SG3 to pulse highway 74 whence they are distributed over the link pulse highways via the associated pulse group gate circuits. As was assumed in connection with the incoming switch previously described, only the pulses fed via gate SG2 over the return path of the XYZ link pulse highway are received in the incoming switch in use on this call, free pulses belonging to other groups and transmitted over other link pulse highways being ineffective.

The trunk marker STM makes a "one only" selection from amongst the pulses of lead 76 and applies a marking over a pair of leads **77*a* and 77*b* to the pair of delay line input gates SG5 and SG6 corresponding to the pair of delay lines associated with the outgoing trunk represented by the identification TDM pulses selected by the trunk marker. It is to be understood that there is a pair of leads corresponding to the leads 77*a* and 77*b***, and a pair of delay line input gates corresponding to the gates SG5 and SG6 for each pulse of the identification TDM.

As was previously described a selection of one of the pulses transmitted over the XYZ link pulse highway is made in the incoming switch for the purpose of establishing a communication channel between the register and the outgoing switch. To this end the selected pulse is transmitted from the incoming switch over the "go" path of the XYZ link pulse highway and is admitted to lead 70 of the outgoing switch via the XYZ group pulse gate SG1. From lead 70 the pulse is fed over lead 71 via gate SI2 to the delay lines, gates SG5 and SG6 being opened by the potential on the leads **77*a* and 77*b* and the pulse is stored in delay lines SDL1 and SDL2 and reaches the modems SGA and SGB. The pulse over lead 70 is also admitted by gate SG4 to gates SG8 and SG9 which are accordingly opened and the delay line circulating system is completed. Pulses on leads 70 and 74, due to connections already in being over the pulse highway, will be circulating in the delay line pairs associated with these connections and consequently these pulses will be inhibited at gate SI1. The pulse on lead 71 that is permitted to pass through gate SI1 appears on lead 73 where it operates the pulse lengthener SPL2 and the element ES to give a signal to the exchange marker that the operation of the switch has been completed. When the pulse circulates in the delay lines it is inhibited at gate SI1 and removes the pulse from lead 73. This causes the potential produced by the pulse lengthener SPL2 to disappear and as a consequence the element ES operates to give the signal to the exchange marker over wire EM2. Upon release of the marker, the backward marking signal is removed from the wire BM, consequently the multiplex SMX and the trunk marker STM are both restored to normal. The pulse circulating in the delay lines and applied to the modems causes gate SGA to open and produce a forward hold signal on wire FH of the outgoing trunk for the purpose previously described and to permit speech over the pulse highway and lead 70 to reach the outgoing trunk. Receipt of the backward hold signal over wire BH from the outgoing relay set causes gate SGB to open for the transmission of speech over lead 74** of the link pulse highway in the "return" direction. The removal of the holding signals closes the gates SG8 and SG9 and removes the stored pulses from the switch.

A description will now be given of the details of some of the circuit elements shown. These detailed circuits of the distributor in the line finder allotter circuit, the potential detection device in the line finder allotter and final selector control circuits and the pulse lengthener SPL2 and associated element ES in the outgoing switch will first be described with reference to Figs. 11, 12 and 13 respectively. Reference will first be had to Fig. 11. In this figure the distributor D will be seen to include the cold cathode tubes CT10, CT11 . . . the tubes CT11 . . . CT*n* operating as a counting chain, being connected to trigger circuits T of which one is shown which includes the cold cathode tube CT20. Associated with the trigger circuit is a slow releasing device SR which includes the cold cathode tube CT21. Relay contact *pb*1 shown at the left of the figure is a contact of relay PB shown in Fig. 3, the contact being shown as a make contact to signify a circuit closing action. In Fig. 11 contact *pb*1 is shown as a break contact which removes earth from the anode circuit of tube CT10 to apply the anode voltage to the tube over resistor R151. Condenser C151 charges and when the condenser voltage reaches the striking voltage of the tube, which is a diode, the tube strikes and the condenser discharges. The resistance of R151 is too high for the tube current to be maintained after the condenser has discharged and the tube is extinguished. The condenser is recharged and the tube is again fired and extinguished and so on as long as contact *pb*1 remains open. Each time the tube strikes a potential is developed across the cathode resistor R152 and a positive pulse is delivered to the striker electrode of one of the tubes CT11–CT*n*. These tubes are arranged in an endless chain, their anodes being connected to a source of anode potential over the common resistor R153, and when one of the tubes strikes it extinguishes the preceding tube on the chain and applies a biasing potential to the succeeding tube on the chain. For the purpose of explanation it will be assumed that the next tube to be struck is the tube CT11 which will have a biasing potential applied to its striker electrode over resistor R157 as will hereinafter appear. The pulse from tube CT10 will be delivered over condenser C152 to the striker electrode of tube CT11 which will thereupon strike and tube CT*n* will be extinguished. As a result of a discharge through tube CT11 a potential will be developed across the cathode resistor R154 and this potential will be applied as a biasing potential to the striker electrode of tube CT12 over resistor R155. When the next pulse is delivered by tube CT10 it will be transmitted via condenser C153 to the striker electrode of tube CT12 and this tube strikes and tube CT11 is extinguished. A potential is developed across the cathode resistor R156 to bias the next tube in the chain in readiness for the next pulse and so on. Thus each pulse delivered by tube CT10 causes a tube of the counting chain to operate and the previously operated tube of the chain to be extinguished. When tube CT*n* is struck the potential across its cathode resistor will be applied as a biasing potential via resistor R157 to tube CT11. As each tube in the chain strikes a positive pulse is applied to the trigger device associated with it which, if not already in use fires. For example, when tube CT12 strikes, a positive pulse is fed over wire 23 and condenser C154 to the striker electrode of tube CT20. If the tube is in a non-conducting condition it will fire and current through resistor R158, the tube and relay RL will flow and the relay will be operated. Relay RL which is the same relay as that similarly designated in Fig. 4 operates to start the allotter and bring about the release of relay PB which in turn at contact *pb*1 stops further pulse generation by tube CT10. When the line finder has found the calling line and the switching relay H has operated the guarding earth applied to the test wire *p* is fed over wiper A1, contact *ha*5 and wire 24 to the striker electrode of tube CT21 and this tube fires. Tubes CT20 and CT21 have their anodes connected over the common resistor R158 so that when tube CT21 becomes conductive tube CT20 is extinguished and relay RL released. Included in the anode circuit of tube CT21 is resistor R159 which is too high to permit of the discharge through the tube to be maintained after condenser C155 has discharged and the tube becomes extinguished. Whilst tube CT21 is conducting the anode voltage on tube CT20 will be too low for that tube to strike should further pulses be received over wire 23, and after tube CT21 has extinguished, the anode voltage on tube CT20 is prevented from rising to a value sufficient to allow this tube to strike for a period sufficient to allow the complete release of the allotter circuits by the time constant of the condenser charge circuit C155 and R158.

Reference should now be had to Fig. 12 which shows the connections of the potential detection device PD shown in the line finder allotter circuit and the final selector control circuit, Figs. 4*a* and 10 respectively. The device includes a four arm rectifier bridge MRB, and a thermionic valve V4 and the high speed test relay TB corresponding to the similarly designated relay in Fig. 4*a* and to relay FTB in Fig. 10. The purpose of the device is to test for a potential —V for the operation of the high speed test relay. The device must respond to this potential or one very close to it but not to a lower or higher potential. In the case of the line finder allotter circuit the high speed test relay is required to operate when a potential of —20 v. is encountered in the marking arc of the line finder. The terminal —V in Fig. 12 will therefore be connected to a potential of —20 v. so that the grid and cathode of valve V4 will be at the same potential and the valve will conduct and the test relay TB will be operated. When the line finder wipers encounter a non-calling line or a line to which a connection has already been made by a line finder the contact in the marking arc of the line finder will be earthed and the grid of valve V4 will be more negative than the cathode and relay TB will not operate. Also in the case where two allotters arrive simultaneously on an outlet marked by —20 v., neither device will operate due to the shunting effect of the resistors RA9 and RA10 in the two allotter circuits causing the potential applied to the terminal 22 to fall below that to which the devices can respond. In the case of the final selector control circuit since the final selector marking bank may have markings applied to it from different master selector circuits at the same time, it is necessary to arrange that the coupling switches in these master selector circuits are each controlled only by the corresponding bank side storage circuit. This is achieved by arranging that each bank side storage circuit effects its marking by a characteristic potential and a corresponding matching potential is applied to the terminal —V in the associated coupling switch circuit. The arrangements of the device must therefore ensure that the valve will only conduct when a potential of —V or one very close to it is encountered by the switch the stopping of which is brought about by the operation of relay TB.

The circuit arrangements of the pulse lengthener SPL2 and the element ES will now be described with reference to Fig. 13. The pulse lengthener includes the thermionic valve V5 and the element ES includes the cold cathode tube CT23. Normally the valve V5 is biased back by a negative potential of 10 v. over resistor R201. When a negative pulse over lead 73 (Fig. 8) is applied over terminal 73 and condenser C201 to the grid of the valve the mean potential of the grid rises due to rectifier MR201 conducting and condenser C201 becoming rapidly charged while between each pulse the condenser discharges over resistor R201. Due to the increase in grid potential the valve conducts and anode current flows. A rise in potential across the anode resistor R202 charges condenser C202 which remains charged as long as the valve is conducting. When the pulses cease valve V5 ceases to conduct and condenser C202 discharges giving rise to a positive pulse to the striker electrode of tube CT23. This tube is biased by a potential of +50 v. applied to the striker electrode over resistor R203 and the positive pulse due to the discharge of condenser C202 causes the tube to strike giving rise to a pulse on its output lead due to a potential derived over cathode resistor R204. Once condenser C203 connected to the anode has discharged, the discharge through the tube cannot be maintained as the resistance of R205 in the anode circuit is too high to permit this and the tube is extinguished. Condenser C203 becomes recharged and the device is ready to respond to the next pulse applied to tube CT23. The pulse on the output lead is transmitted to the exchange marker as a signal that the operation of the outgoing switch has been completed so far as the marker is concerned.

Figure 14:
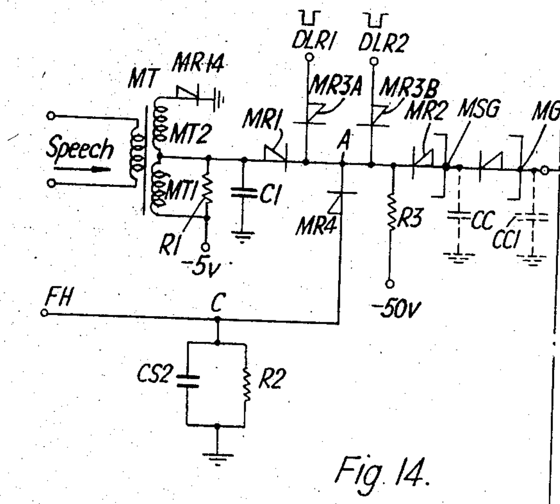
Figure 15:
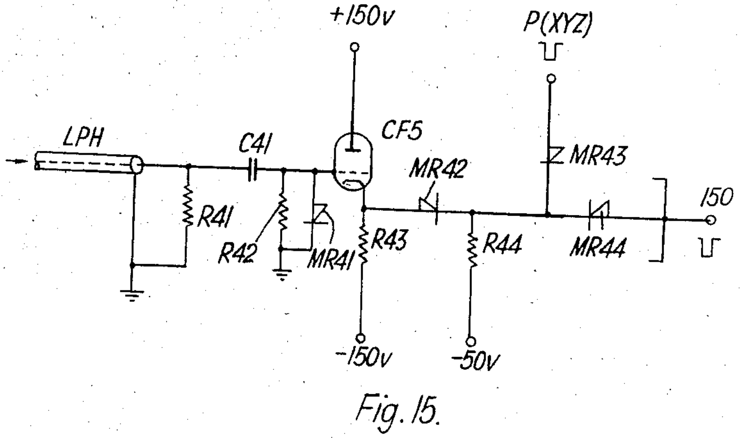
Figure 18:
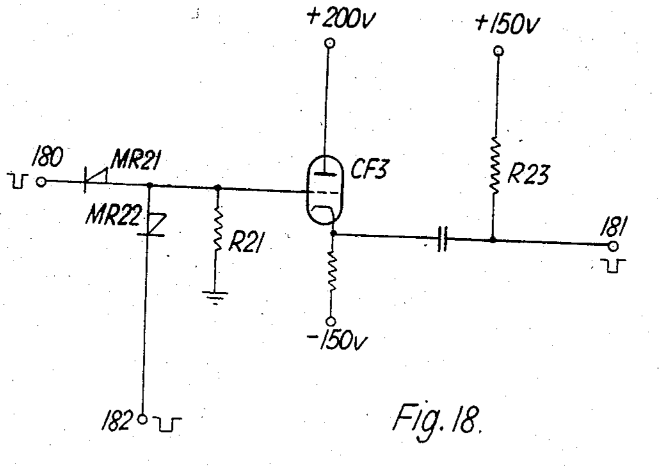
Figure 19:
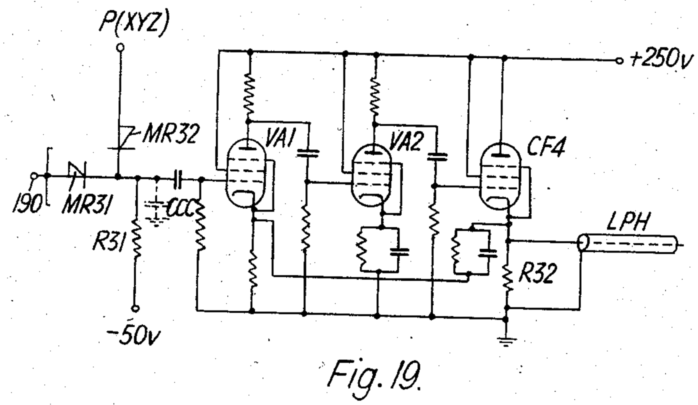
Figure 20:
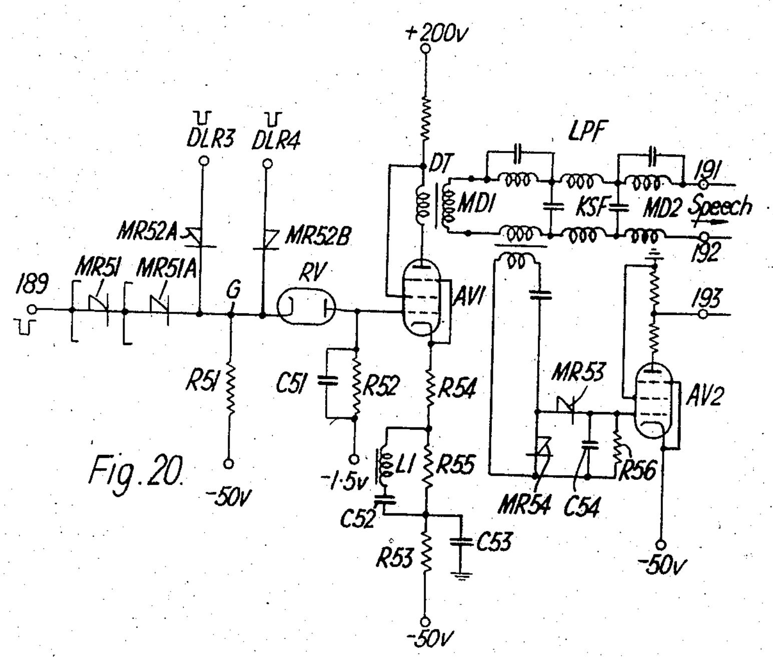

A description will now be given of the details of the modulators and demodulators and gates in the speech path. The elements comprising the "go" speech path through an incoming and outgoing switch are shown in Figs. 14, 16, 17, 18 and 19 which should be assembled in the order named from left to right. For the return speech path Figs. 15, 16, 17, 18 and 20 should be assembled in the order named from left to right. Fig. 14 illustrates a pulse modulator circuit and Fig. 16 a discharge circuit, the two figures when taken together illustrating the modulators designated PGA (Fig. 6) RGB, RGD (Fig. 7*a*) and SGA (Fig. 8). Fig. 17 illustrates the inhibiting gates PI2 and PI3 in Fig. 6*a*. Fig. 18 illustrates a one-way gate such as those designated PG11, PG21 (Fig. 6*a*) and Fig. 19 shows the circuit of a group pulse gate combined with an output pulse amplifier. Such gates include those designated PG18 (Fig. 6*a*) and SG2 (Fig. 8). Fig. 15 illustrates a trunk terminating and group pulse gate, such gates including those designated PG19 (Fig. 6*a*) and SG1 (Fig. 8) and Fig. 20 illustrates the pulse demodulators designated PGB (Fig. 6), RGA, RGC (Fig. 7*a*) and SGB (Fig. 8). Gates PG6 and PG28 are similar to that shown in Fig. 19 while gates PG7, PG15 and PG29 are similar to that shown in Fig. 15 but in these cases the group pulses P (XYZ) are replaced by pulses from associated delay lines.

Reference will first be had to the "go" speech transmission path commencing with Fig. 14. The modulating gate comprises an input transformer MT, a modulating rectifier MR1, three gate switching rectifiers MR3A, MR3B, and MR4 and commoning rectifiers MR2 and MR2A. The input transformer MT has two secondary windings, the secondary winding MT1 is the winding across which the audio frequency voltages to be modulated are developed and the secondary winding MT2 is arranged in conjunction with the serially connected rectifier MR1A to operate as a limiter winding to limit the depth of pulse modulation effected by the circuit. The gate circuit rectifiers MR3A and MR3B are connected via terminals DLR1 and DLR2 to the output pulse highway from the pair of delay lines associated with this pulse modulator circuit, while the gate circuit rectifier MR4 is connected to the backward or forward hold lead FH from the associated line or supervisory circuit or the like with which the modulator is associated, and to earth via the parallel resistance condenser combination C2, R2. Within the delay line circuits the output pulse highways are connected to earth via low impedance transformer windings thus in the absence of any output pulse from the associated pair of delay lines current passes through the rectifiers MR3A and MR3B and the associated resistor R3, to a −50 v. source. Similarly in the absence of a backward or forward hold signal on the lead FH current passes from earth via resistor R2, and through rectifier MR4 and resistor R3 to the −50 v. source. As a result of current flow in the above traced circuits, the point A in the modulating circuit is anchored to earth potential and the components of the circuit are so chosen that the point A will remain anchored to earth potential so long as any one of the three gate switching rectifiers is passing current. Thus although a negative going pulse from the delay line associated with the gate switching rectifier MR3A will bias this rectifier to its non-conducting condition, the continued conduction of rectifier MR3B and MR4 will maintain the point A substantially at earth potential. Even if both rectifiers MR3A and MR3B are biased to non-conduction by coincident pulses from the pair of delay lines associated with the modulator, the point A will still remain at earth potential due to the conduction of rectifier MR4. The capacitance C2 is sufficiently large to prevent the potential of point C falling appreciably below earth when it is charged during each pulse which renders rectifiers MR3A and MR3B non-conducting, and the resistance of R2 is such that C2 can discharge during the intervals between pulses. So long as the point A in the modulating circuit remains at earth potential the modulating rectifier MR1 will be biased to non-conduction by the −5 v. bias potential applied to the lower end of the transformer winding MT1 and hence there will be no output from the modulator. Upon receipt of a backward or forward hold signal the potential of point C falls to approximately −10 v. and when rectifiers MR3A and MR3B are biased to non-conduction by receipt of coincident pulses from their delay line pair, the potential of point A falls until rectifier MR1 conducts and clamps the potential of point A to that of point B which, in the absence of any audio voltage will be approximately −5 v. The modulator gate thus generates output pulses corresponding to the pulses stored in the associated pair of delay lines, i.e. pulses 0.8 microsecond wide at 10 k./s. recurrence frequency. In order that the rectifier MR1 may clamp the potential of point A accurately to the sum of the potentials of the audio voltage developed over the transformer secondary winding MT1 and the bias source, these two sources should be of low impedance. However it is desirable for the modulating signal source impedance to be high in order that the transformer MT may have a step-up ratio to obtain a large modulating voltage. These requirements are reconciled by providing the secondary winding with a low impedance load circuit comprising the resistor R1 and condenser C1. The condenser C1 is chosen to be sufficiently large for the potential difference across it to change little during a pulse when current flows through rectifier MR1 and the resistance of R1 is made sufficiently small for the shunting effect of the reactance of C1 at high modulating frequencies to be negligible. In the event of a modulating voltage tending to drive the upper end of winding MS2 beyond earth potential, the rectifier MR1A conducts and clamps this end to earth potential and the turns ratio between windings MT1 and MT2 is such that when this occurs the potential of point B is approximately −2.5 volts, so ensuring that an output pulse from the modulating circuit cannot be wiped out by the modulation.

The modulating gate circuits forming a sub group are commoned together at the point MSG and the subgroups are commoned together at the point MG. Rectifiers MR2 and MR2A are poled so as to prevent any direct coupling between the various modulating circuits forming a group. In commoning the modulating circuits of a group, however, a considerable stray capacitance is introduced by the commoning leads themselves, and coupling due to this is avoided by the discharge circuit shown in Fig. 16 as follows. The stray capacitance due to the commoning is indicated in Fig. 14 by the dotted condensers CC and CC1. When the point A is at earth potential, current from the +150 v. source (Fig. 16) flows via high resistance R4 and rectifier MR6 to earth and the rectifier clamps the grid of the cathode follower valve CF1 to earth potential. When the point A is driven negative by the operation of the gate switching rectifiers an initial charging current flows from the stray capacitance via rectifiers MR2 and MR2A and resistor R3 to the −50 v. source, the stray capacitance being charged to the sum of the modulating and bias voltages, rectifier MR6 is biased to cut off and therefore a small current flows from the +150 v. terminal via resistor R4, rectifiers MR2A and MR2, and resistor R3 to the −50 v. terminal thus enabling the rectifiers to clamp the grid of the cathode follower valve CF1 to the sum of the modulating and bias potentials. When the rectifier switching gate again closes, point A returns to earth potential and consequently rectifiers MR2 and MR2A become non-conducting. Since the resistance of R4 is high, the stray capacity CC cannot discharge through it readily. To get the stray capacitance discharged rapidly, it is arranged that upon rectifiers MR2 and MR2A becoming non-conductive due to the disappearance of the delay line pulses, a short duration positive pulse, derived from the communication TDM clock pulse source is applied via terminal KS1, and condenser C4 to earth over resistor R6 causing rectifiers MR5 and MR2A to conduct momentarily and discharge the stray capacitance CC. The cathode follower valve CF1 serves to provide a high load impedance to the modulator circuits and a low source impedance R5 to the pulse highway PH through the switch.

The inhibiting gate circuit of Fig. 17 serves to inhibit the pulses used in setting up a call from the link highway. The gate comprises pulse width timing rectifiers MR11 and MR12, inhibiting valve circuit IV and output cathode follower circuit CF2. The function of the pulse width timing rectifiers is to reduce the width of the channel pulses from the pulse modulator circuit prior to their inhibition. This is necessary because, to ensure complete inhibition of a pulse, the inhibiting pulse must overlap the channel pulse in time, and the inhibiting pulses from the register pulse highway are nominally of the same (0.8 microsecond) duration as the channel pulses. The 0.8 microsecond duration channel pulses are applied via terminal 170 and condenser C11 to rectifier MR11, and a train of 0.2 microsecond duration clock pulses are applied via terminal KSX and condenser C12 to rectifier MR12. In the absence of both of these pulses, the rectifiers MR11, MR12 and MR13 conduct, the latter rectifier clamping points A1 and B1 to earth potential. Shortly after the beginning of a channel pulse, a clock pulse occurs and rectifiers MR11 and MR12 are cut off. In the absence of an inhibiting pulse the inhibiting valve IV is biased so that it passes sufficient anode current to drive the point B1 negative, charging the stray capacitance CCB as it does so, until the amplitude of the negative excursion of point B1 equals the amplitude of the received channel pulse, whereupon rectifier MR11 begins to conduct once more. The amplitude of the clock pulse is arranged to be such that it is always greater than the amplitude of the largest channel pulse that can be received in order to ensure that rectifier MR12 remains cut off until the termination of the clock pulse whereupon rectifier MR12 again conducts and a current flows firstly to discharge the stray capacitance CCB and then to earth via rectifier MR13 which again clamps the points A1 and B1 to earth potential. The negative going pulse developed at point B1 is applied to the control grid of the cathode follower valve CF2 and a corresponding negative going pulse is developed over its cathode resistor R15 and passed via output terminal 171 to the input terminal 180 of the one way gate of Fig. 18. Should the channel pulse in Fig. 17 require to be inhibited, a negative going 0.8 microsecond pulse is applied from the register pulse highway over terminal 172 and condenser C13 to the control grid of the inhibiting valve IV cutting off this valve and permitting a current to flow via R14 to earth via rectifier MR13 so maintaining point A1 clamped to earth potential when rectifiers MR11 and MR12 are both cut-off due to receipt of coincident channel and clock pulses. Rectifier MR14 provides for the direct current restoration of the pulses applied to terminal 172 after their passage through condenser C13.

The one-way gate of Fig. 18 comprises the rectifiers MR21 and MR22 and a cathode follower output valve CF3. The rectifier MR21 is connected over terminal 180 to terminal 171 of Fig. 17 and the rectifier MR22 is connected to the output of a cathode follower valve located in a circuit in the register pulse highway and terminal 182. In the absence of a channel pulse on terminal 180 and a register-switch pulse on terminal 182 neither rectifier MR21 nor MR22 conducts and the control grid of the cathode follower CF3 is maintained at earth potential by the earth connected resistor R21. Upon a negative going pulse being applied to either of the terminals 180 or 182, the corresponding rectifier MR21 or MR22 conducts, and the non-conducting rectifier is biased back, thus enabling the pulse to be developed at the control grid of the cathode follower CF3 by current flow through resistor R21 and the pulse is reproduced by the cathode follower action of the valve at the output terminal 181, from whence it is passed to terminal 190 of the group pulse gate circuits, one of which is shown in Fig. 13.

In the system of the present invention there is provided one pulse group gate circuit and associated output pulse amplifier for each of the pulse groups forming the main communication time division multiplex system. The circuits are commoned together at their input terminals and comprise a pulse group gate circuit, consisting of rectifiers MR31 and MR32 and resistor R31, and an output pulse amplifier, which amplifies the communication pulses prior to transmission over the associated link pulse highway such as LPH in Fig. 19, and which consists of amplifying valves VA1 and VA2 and an output cathode follower valve CF4. The pulse group gate circuits are distinguished from one another by the application of a different group pulse train to the terminal P(XYZ) for the control of the switching rectifier MR32 in each gate circuit the bracketed letters indicating the group of pulses concerned, (XYZ) being quoted only as an example. The operation of the pulse group gate circuit shown in Fig. 19 is as follows: The potential of the junction between the rectifiers MR31 and MR32 and resistor R31 is, in the absence of any highway or group pulse, clamped to earth by the conduction of MR32. When the gate receives coincident negative pulses from the highway via terminal 190 and from the group pulse source via terminal P(XYZ) both these rectifiers are cut off and the current in R31 which charges the stray capacity CCC causes the potential of the junction between resistor R31 and rectifiers MR31 and MR32 to fall. This point therefore goes negative until rectifier MR31 begins to conduct again and in doing so clamps the potential of the junction point to that of terminal 190. The amplitude of the negative going pulse applied to the control grid of the amplifier valve VA1 is thus determined by the amplitude of the highway pulse on terminal 190, the amplitude of the pulses from the group pulse source via terminal P(XYZ) being arranged to exceed the largest amplitude highway pulse that can be received. The amplifier valves VA1 and VA2 are resistance-capacity coupled and consequently a negative going input pulse results in an amplified negative going output pulse appearing at the anode of valve VA2. The amplifier valve VA2 is also resistance capacity coupled to the cathode follower valve CF4 and the negative going input pulse from valve VA2 results in a negative going pulse being developed over the load resistance R32. The cathode of the cathode follower valve is coupled to the cathode of the first amplifier valve VA1 via a resistor and condenser connected in parallel so as to provide a large amount of overall negative feedback. The cathode follower CF4 provides a low output impedance for feeding the link pulse highway and the negative feedback provides the amplifier with a stable overall gain and a large band width.

The end of the link pulse highway LPH remote from that shown in Fig. 19 is terminated on a group pulse gate circuit as shown in Fig. 15. The circuit comprises a terminating resistor R41, a cathode follower valve circuit CF5 and a group pulse gate circuit comprising rectifiers MR42 and MR43.

The negative going pulses from the link pulse highway LPH are developed over resistor R41 and are applied via condenser C41 and resistor R42 to the control grid of the cathode follower valve CF5, direct current restoration of the pulses developed across R42 being effected by the rectifier MR41. The negative going channel pulses from the cathode of valve CF5 are applied to the group pulse gate circuit comprising rectifiers MR42, MR43 and resistor R44. The operation of this gate is exactly the same as the group pulse gate circuit previously described in connection with Fig. 18 and the channel pulses from the gate circuit are fed via rectifier MR44 and terminal 150 to a pulse highway in common with the outputs from other group gate circuits. In this "return" communication path the terminal 150 is connected by a discharging circuit as shown in the previously described Fig. 16 via an inhibiting gate circuit such as shown in the previously described Fig. 17 and a one way gate circuit such as shown in the previously described Fig. 18 to a pulse demodulator circuit such as shown in Fig. 20.

The pulse demodulator circuit shown in Fig. 20 comprises commoning rectifiers MR51 and MR51A, a "coincidence of two" gate circuit comprising rectifiers MR52A and MR52B and resistor R51, a pulse lengthening circuit consisting of a thermionic rectifier RV, a resistor R52 and condenser C51, an amplifying output valve AV1 the output of which is fed into a balanced low pass filter LPF, and a forward hold signal generating valve AV2 which is coupled to the low pass filter via transformer CT and the voltage doubling network formed by rectifiers MR53 and MR54 and condenser C54.

Negative going channel pulses to be demodulated are applied to terminal 189 over the pulse highway from terminal 181 (Fig. 18). The terminals DLR3 and DLR4 are respectively connected to the output terminal of each of the delay lines of the pair allocated to this demodulator circuit and, as in the case of the modulator circuit of Fig. 14, the rectifiers MR52A and MR52B serve to keep the point G anchored to earth potential so long as one or both of the rectifiers are conducting. In the absence of a channel pulse on terminal 189, receipt of coincident pulses from the delay line pair on terminals DLR3 and DLR4 cause the rectifiers MR52A and MR52B to be biased back and consequently point G and terminal 189 will be driven negative, biasing back the other series rectifiers corresponding to MR51 and MT51A in the other commoned demodulating circuits, while the rectifiers MR51 and MR51A of this demodulating circuit pass substantially the whole of the current flowing from the +150 volts source via resistor R23 (Fig. 18)

to the —50 volts source via R51 in this circuit (Fig. 20). The resultant change in potential of terminal 189 constitutes a small 0.8 microsecond pedestal pulse, and any coincident negative going channel pulse arriving at terminal 189 will be superimposed on this pedestal. The pulse lengthener circuit is provided with a negative bias of —1.5 volts so that when pedestal pulses only are present little or no output will be obtained from this circuit, but when coincident channel and pedestal pulses appear at point G the pulse lengthener circuit produces a sawtooth waveform at the grid of the audio frequency amplifier AV1. The gain of valve AV1 is stabilised by A.C. and D.C. negative feedback provided by the resistor R54 and resistor R53 shunted by condenser C53. To compensate for attenuation distortion caused at high audio frequencies by the pulse lengthener, transformer DT and low pass filter LPF, a series tuned circuit L1, C52 is shunted across resistor R55 to reduce the A.C. negative feedback at high audio frequencies by an amount which provides requisite equalisation of the overall gain without allowing the valve to be overloaded by signal components at the pulse recurrence frequency and its harmonics. The output from the valve AV1 is fed via transformer DT to the low pass filter LPF. This filter has a characteristic impedance of 600 ohms and has one constant "K" section KS and two "M" derived half sections MD1 and MD2 and the audio frequency output from the filter is fed to a pair of speech wires via terminals 191 and 192. When the demodulator circuit is receiving channel pulses a substantial 10 kc. p. s. pulse recurrence frequency component is developed across the "M" derived half section MD1 of the filter LPF and the voltage of this pulse is stepped up by the coupling transformer CT the primary winding of which is included in the "M" derived half section MD1 of the filter and the secondary winding of which is tuned to the pulse recurrence frequency by the condneser C55. The 10 kc. p. s. voltage is rectified by the voltage doubling circuit comprising rectifiers MR53, MR54 and condenser C54 and the resulting D.C. voltage developed over resistor R56 is applied to the control grid of the forward hold generating valve AV2, causing it to conduct and produce at its output terminal 193 a negative going forward hold signal of approximately 10 v.

Figure 16:
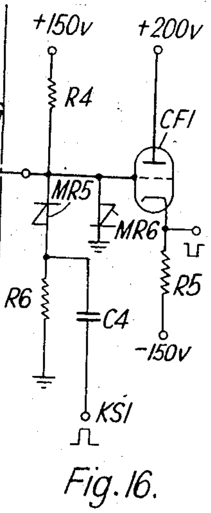
Figure 17:
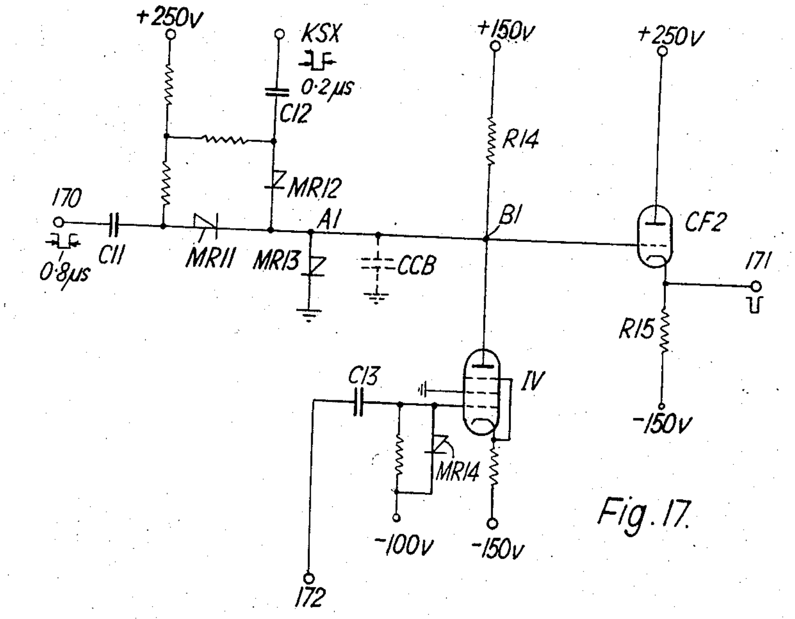

In the case of the communication path from the register switch to the main communication pulse highway, the modulator circuit is as shown in Figs. 14 and 16, and the demodulator circuit is as shown in Fig. 20, and these circuits are connected to the inhibiting terminals of inhibiting gate circuits such as that shown in Fig. 17 via "coincidence of two" gate circuits such as formed by the rectifiers MR31, MR32 and resistor R31 in Fig. 19.

In the case of the communication path through the secondary unit switches the "go" path includes Figs. 14, 16, and 19, while the "return" path includes Figs. 15 and 20.

Figure 21:
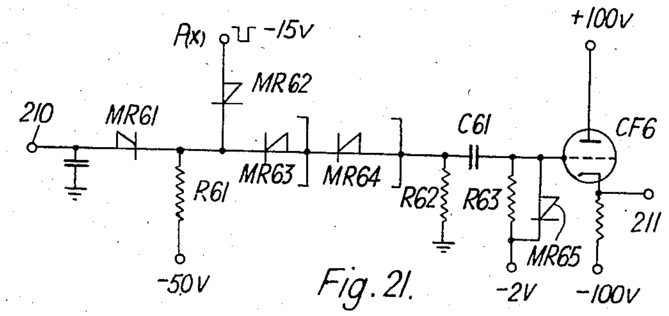
Figure 22:
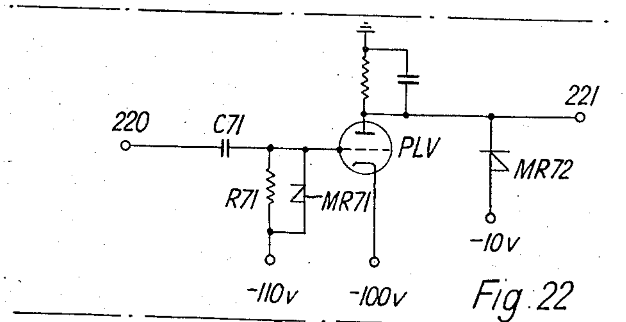
Figure 23:
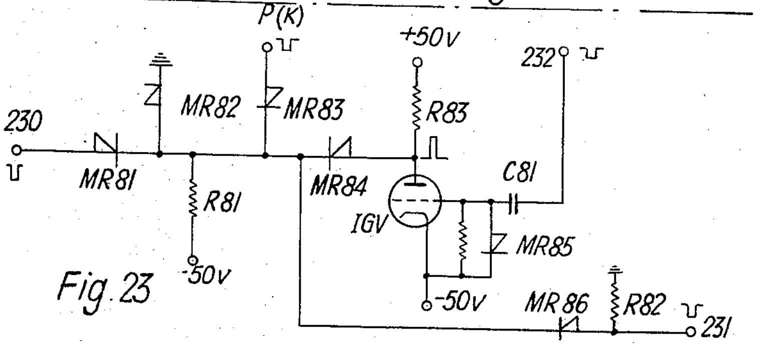
Figure 24:
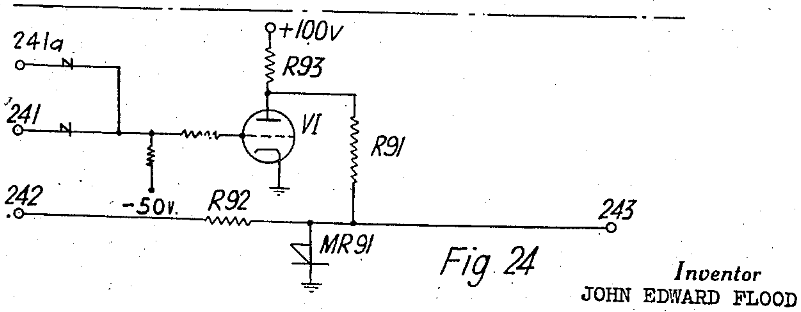
Figure 25:
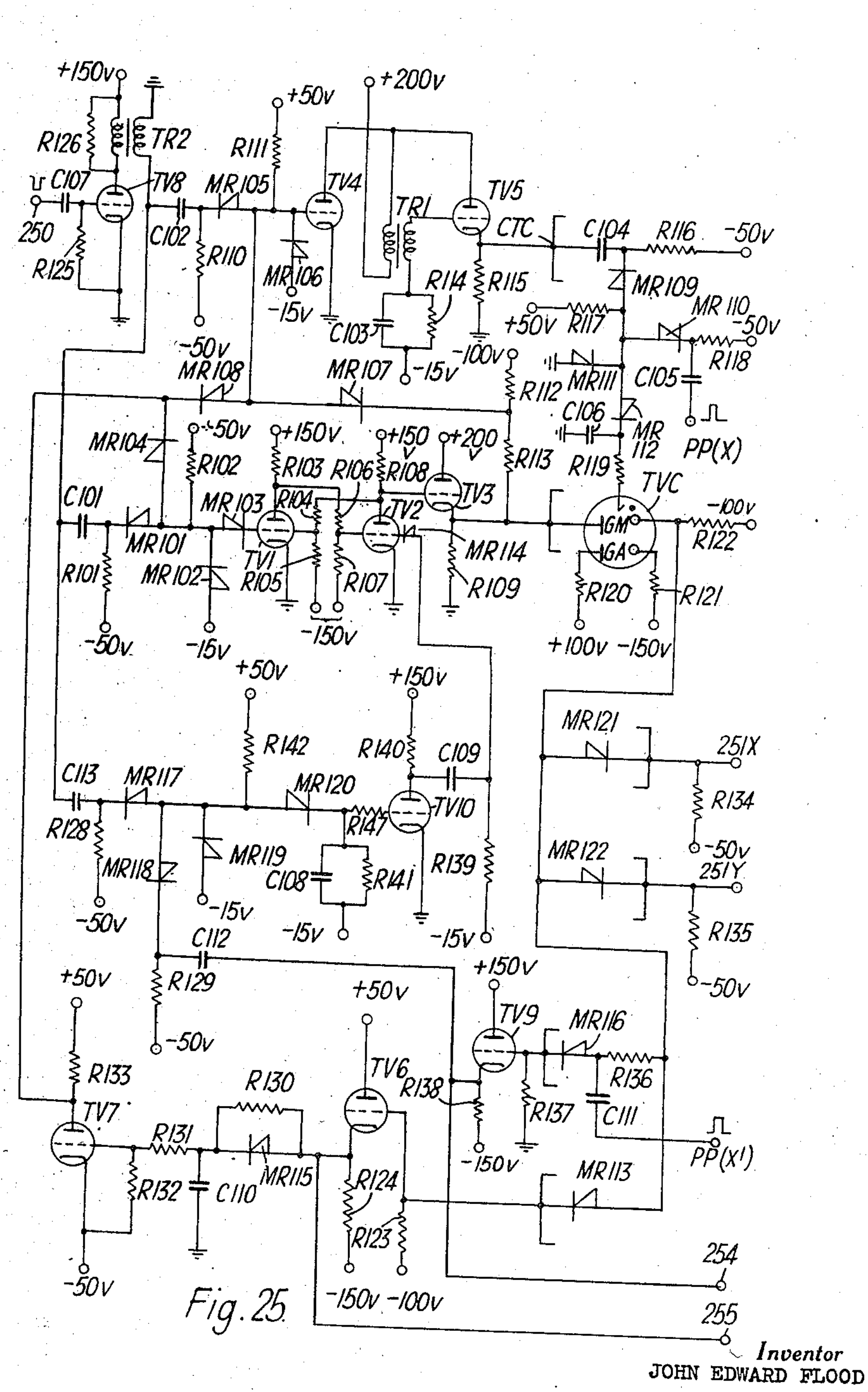
Figure 26:
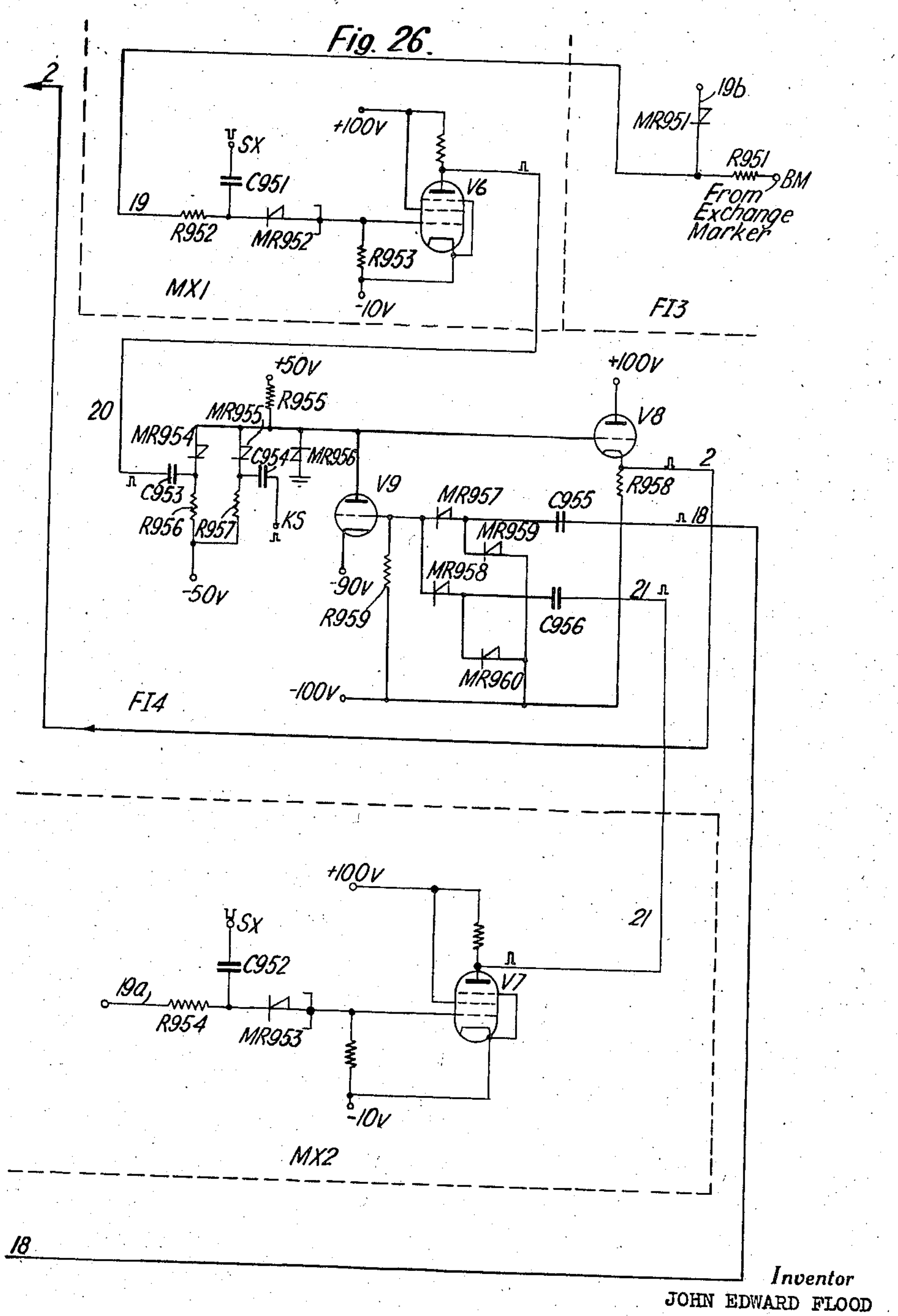

The detailed circuits illustrated in Figs. 21 to 25 will now be described. Fig. 21 illustrates a multiplex circuit such as the identification multiplexes designated PMX1 and PMX2 (Fig. 6), SM (Fig. 8) and the multiplex circuits PMX and RMX in Fig. 7. Fig. 22 illustrates a pulse lengthener circuit such as those designated PL in Figs. 6 and 6*a*, RL1 in Fig. 7*a* and SPL1 in Fig. 8. Fig. 23 illustrates and inhibiting gate, including those designated PI1 (Fig. 6), SI1 (Fig. 8). Fig. 24 illustrates the D.C. inhibiting gate designated RI1 (Fig. 7) and Fig. 25 illustrates circuits that may be used in the several markers and pulse selectors such as those designated PTM (Fig. 6), PMS (Fig. 6*a*), MSP and SM (Fig. 7) and STM (Fig. 8).

Reference will first be had to Fig. 21. The multiplex circuit comprises a number of gate circuits, one for each trunk served by the switch, and each gate circuit consists of three rectifiers such as MR61, MR62, MR63 and a resistor such as R61 connected to a —50 v. source. Each rectifier MR62 is supplied over terminal P(*x*) with a pulse train, the pulses of which occupy a time position in the identification time division multiplex system corresponding to the trunk with which the gate circuit is associated. Sub-groups of these gate circuits are commoned, the common circuit including rectifier MR64 and all the sub-groups are commoned together and connected to an earth connected load resistor R62. When a marking or holding signal of —10 v. is applied to the terminal 210 corresponding to the associated trunk (BM, FH or BH leads, as the case may be) the corresponding rectifier MR61 is biased back so that, when the negative going pulse associated with the trunk is applied to terminal P(*x*), rectifier MR62 is also biased back and a stray capacity charging current flows through resistor R61, rectifiers MR63, and MR64 to produce a negative-going pulse across resistor R62. This pulse is applied via condenser C61 and resistor R63 to the cathode follower valve CF6 which reproduces the pulse at the output terminal 211. Since the amplitude of the pulse applied to terminal P(*x*) is greater than the amplitude of the marking or holding signal applied to terminal 210, the amplitude of the output pulse obtained from terminal 211 is approximately the same as that of the applied marking or holding signal. The rectifier MR65 provides for the D.C. restoration of the pulse developed over resistor R62 after its passage through condenser C61.

The pulse lengthener circuit of Fig. 22 has an input terminal 220 to which negative going pulses are applied. In the absence of input pulses, the pulse lengthening valve PLV is biased to cut off and consequently the output terminal is at substantially earth potential. When negative going pulses are applied to terminal 220 the mean potential of the control grid of valve PLV is caused to rise due to the fact that during each pulse rectifier MR71 conducts and rapidly charges condenser C71 while between each pulse the condenser discharge path is via resistor R71. The valve PLV is thus caused to pass anode current and the potential of its anode falls from earth potential until it is anchored to —10 v. by conduction of the rectifier MR72. The circuit thus provides a —10 v. D.C. signal on its output terminal 221 so long as input pulses are being applied to terminal 220.

The inhibiting gate circuit of Fig. 23 has an input terminal 230, an output terminal 231, an inhibiting terminal 232 and a gating terminal P(K). To this latter terminal is applied a clock pulse train, the pulses of which coincide with every possible time position in the time division multplex cycle concerned, but whose duration is shorter than that of the pulses applied to the input terminal 230. In the absence of any applied pulses, the junction point of the switching rectifiers and the rectifier MR86 will be slightly negative due to the conduction of rectifiers MR81, MR83 and MR86 from low impedance earth sources to —50 v. via resistor R81. If an input to terminal 230 is one which is not to be inhibited the occurrence of the negative going pulse causes rectifiers MR81 to be biased back and shortly after the onset of this pulse, the shorter duration clock pulse arriving at terminal P(K) causes rectifier MR83 also to be biased back. The valve IGV is unbiased and the valve is consequently passing anode current lowering the anode potential to a point at which rectifier MR84 is biased back, and as a result of the biasing back of the three gate switching rectifiers MR81, MR83, MR84, current flow from earth over resistor R82 via rectifier MR86 to —50 v. via resistor R81 results in a negative going pulse being applied to output terminal 231. If a negative going inhibiting pulse is applied to terminal 232, the valve IGV is cut off causing the anode potential of the valve to rise and allowing rectifier MR84 to conduct. The current which rectifier MR84 passes is arranged to be greater than that which passes through resistor R81 to —50 v., and consequently rectifier MR82 conducts and clamps the junction point of the gate switching rectifiers to earth so preventing any output pulse being produced in response to an input pulse on the input terminal 230. In the case of the inhibiting gate SI1 (Fig. 8) there is a separate inhibiting lead from each delay line circuit consequently whenever a pulse becomes stored in any delay line that pulse is prevented from passing through SI1 to the pulse lengthener SPL2.

The inhibiting gate circuit of Fig. 24 has two inhibiting input terminals 241 and 241*a* and signal input and output terminals 242 and 243 respectively. In the absence of an inhibiting input to either of the terminals 241, 241*a*, the grid of valve VI is at earth potential; the valve VI passes anode current resulting in its anode potential being low, and when a signal of —10 v. appears on terminal 242, current flow through resistors R93, R91 and R92 causes the junction point of resistors R91, R92 and rectifier MR91 to be brought to approximately —10 v. and this extends the signal to terminal 243. When an inhibiting signal of —10 v. is present on both terminals 241 and 241*a* the valve VI is cut off and its anode potential rises, and when the signal appears on terminal 242, the current it causes to flow in resistor R92 is less than the current which flows in resistors R93 and R91, consequently rectifier MR91 conducts and clamps the junction point of resistors R92 and R91 to earth potential, thus blocking the passage of the signal.

The trunk marker and pulse selector circuit of Fig. 25 comprises ten thermionic valves TV1–TV10 and a group of cold cathode discharge tubes of which only one, tube TVC is shown. This group of cold cathode discharge tubes contains one tube for each pulse in the corresponding time division multiplex. For example, if the circuit is used as a trunk marker in a primary unit switch, the group may contain up to 1000 cold cathode tubes such as TVC; on the other hand, if the circuit is used as a communication pulse selector the group will contain 100 such tubes. The circuit has an input terminal 250 to which input pulses are applied from an associated pulse highway, a group of terminals to pairs of which D.C. output markings are applied and of which only two (terminals 251X and 251Y) are shown, a pulse output terminal 254 and a "connected" output terminal 255, to which the circuit applies a positive D.C. potential to indicate that it has completed its function. If the circuit is to be used as a trunk marker no connection will be made to the output pulse terminal 254 and in certain circumstances the terminal 255 will also be left unconnected. If the circuit is to be used as a pulse selector, no connection will be made to the group of terminals 251. Of the ten thermionic valves, valve TV8 is an input pulse amplifying valve, valves TV1, TV2 and TV3 together with their associated rectifiers and resistors serve, in response to an input pulse, to condition the group of cold cathode tubes of which TVC is one, valves TV4 and TV5 and their associated rectifiers and resistors constitute an input selecting circuit for the operation of a particular cold cathode tube TVC as determined by a coincident pulse over terminal PP($x$), this pulse being derived from the communication TDM cycle. Valves TV6 and TV7 together with their associated circuit elements, constitute an inhibiting circuit to ensure that the selecion effected by the valves TV4 and TV5 is a one and one only selection and valves TV9 and TV10 are concerned with the restoration to normal of the circuit after the cessation of the input pulses to terminal 250.

Considering the circuit in greater detail, negative pulses applied to terminal 250 are amplified by valve TV8 which produces positive pulses from the secondary winding of its output transformer TR2. In the absence of input pulses the valves TV1, TV4 and TV10 are biased to —15 v. due to conduction of the associated rectifiers MR102, MR106 and MR119. In the case of valve TV4 the conduction of rectifier MR106 is possible due to current flow from the +50 v. terminal, resistor R111 and firstly, via rectifier MR107, resistor R112 to the —100 v. terminal and via rectifier MR105 and resistor R110 to —50 v. terminal causing the grid potential of the valve to fall until it is clamped by rectifier MR106. In the case of valve TV1, rectifier MR102 conducts due to current flow from the +50 v. terminal, resistor R102 rectifier MR101 and resistor R101 to —50 v. terminal causing the grid potential of valve TV1 to fall until, it is clamped by rectifier MR102, and similarly in the case of valve TV10, rectifier MR119 conducts due to current flow from the +50 v. terminal via resistor R142, rectifier MR117, resistor R128 and also over the parallel connected rectifier MR118 and resistor 119 to —50 v. terminal. Further, the inhibiting valve TV7 is cut off in the absence of any input from the associated cold cathode tubes via valve TV6 due to current flow from —50 v. via resistors R132, R131, R130, R124 to —150 v. and the positive potential on the anode of valve TV7 biases off the inhibiting gate rectifiers MR104 and MR108.

Upon the circuit being taken into use the first positive pulse from the secondary of transformer TR2 is applied via the condensers C102, C101 and C113 to bias back the associated rectifiers MR105, MR101 and MR117 but due to the alternative biasing paths for rectifiers MR106 and MR119 valves TV4 and TV10 are unaffected by this pulse. As a result of the biasing back of the rectifier MR101 the control grid potential of valve TV1 rises until rectifier MR101 again conducts and clamps the grid potential to that of the positive input pulse. This positive pulse is applied to the grid of valve TV1 via rectifier MR103 and the valve conducts, thereby lowering its anode potential and cutting off valve TV2. Valves TV1 and TV2 have their control grids and anodes cross connected via resistors R104–R107 so that the valves form a bi-stable trigger circuit, consequently after the input pulse has terminated valve TV1 remains "on" and valve TV2 remains "off." The rise in anode potential of valve TV2 is conveyed by the cathode follower valve TV3 to provide an effective H.T. supply for the group of cold cathode tubes of which TVC is one. The rise in cathode potential of valve TV3 also results in the junction of resistors R112 and R113 becoming positive with the result that rectifier MR107 is biased back thus removing the alternative biasing path for rectifier MR106. The next positive input pulse from the secondary winding of transformer TR2 is therefore applied via rectifier C102 to cut off rectifier MR105 with the result that the control grid of valve TV4 is driven positive, in the same way as described above for valve TV1. Valve TV4 conducts and since this valve shares a common anode load with valve TV5, the anode potential of both these valves is caused to fall. The valve TV5 is connected in a blocking oscillator circuit and the large positive feed back through transformer TR1 causes a large amplitude positive pulse to be applied to the control grid of this valve resulting in the flow of large anode and grid currents. The grid current produces a large negative charge on the condenser C103 with the result that at the end of the positive input pulse the valve is biased well beyond cut off and the discharge time constant of the combination C103, R114 is made such that the circuit is maintained in its blocked condition for at least the time required for a complete cycle of the pulse train applied to terminal 250. Thus, only one pulse in the cycle is applied to the circuits of the cold cathode tubes from the cathode of valve TV5. Each of the cold cathode tubes is connected to the cathode of a valve such as TV5 over the common point CTC. The tube TVC shown is connected via a pulse lengthener circuit, comprising a rectifier MR112, a condenser C106, and a resistor R119, and a gate circuit comprising rectifiers MR109, MR110 and MR111, resistors R116, R117 and R118 and condensers C104 and C105. The pulse from the cathode of valve TV5 is applied to the gate circuit shown via the condenser C104 and cuts off rectifier MR109. If this pulse is coincident with the pulse which is applied via condenser C105 (the pulse applied to each gate circuit via the terminal PP($x$) occupying a different time position in the time division multiplex system concerned) the rectifier MR110 will also be biased back and the potential of the junction between these two rectifiers rises biasing back rectifier MR111 until current from the +50 v. terminal via resistor R117 and rectifier MR109 causes the junction point of the gate switching rectifiers to be clamped to the potential of the input pulse applied to condenser C104. Thus when the pulse applied from the cathode of valve TV5 is coincident with the pulse associated with the cold cathode tube TVC, the associated gate circuit applies a positive potential to charge the pulse lengthening condenser C106 via rectifier MR112. The potential of the junction of condenser C106 and rectifier MR112 is thus raised sufficiently to fire the tube TVC. This latter tube is of the type which has a discharge permanently present across an auxiliary gap GA to which current is fed over resistors R121 and R120 which are connected respectively to a —150 v. terminal and a +100 v. terminal, and this discharge serves to increase the sensitivity of the trigger gap. When the main gap GM breaks down, the potential difference across the resistor R122 causes the potential of the main cathode to rise from —100 v. to approximately that of earth. This rise of potential is applied to the pair of output terminals 251X and 251Y associated with the tube TVC, over rectifiers MR121 and resistor R134, and rectifier MR122 and resistor R135, and also to the control grid of valve TV6 which being a cathode follower produces a corresponding rise in potential at its cathode, over resistor R124. This latter rise in potential is applied to terminal 255 for external circuit control if required or for use as a "pulse selector connected" signal to the common exchange marker. It is also applied via the slow release circuit comprising rectifier MR115, condenser C110 and resistor R130, and via resistor R131 causing a potential difference to appear across R132 and the grid-cathode of valve TV7, causing this latter valve to conduct. The potential of the anode of valve TV7 consequently falls below earth potential and this causes the rectifiers MR104 and MR108 to conduct thus inhibiting the valves TV1 and TV4 and so preventing any further input pulses from entering the pulse selecting circuits. The rise in cathode potential of tube TVC also removes the bias from rectifier MR116 thus enabling the positive pulses of the pulse train over terminal PP($x^1$) corresponding to the tube TVC to pass to the control grid of valve TV9 via condenser C111 and resistor R137. These pulses are also derived from the communication TDM cycle. The valve TV9 is a cathode follower and consequently the valve reproduces the pulses received over terminal PP($x^1$) at its cathode, the positive going pulses being applied to output pulse terminal 254, and also via condenser C112 to a "coincidence of two" gate comprising rectifiers MR117, MR118, MR119 and resistors R128, R129 and R142. The input pulses from terminal 250 are also applied to this gate via condenser C113 and since one of the received pulses must coincide with one of the input pulses the gate opens and passes positive pulses to the pulse lengthener circuit comprising rectifier MR120, condenser C108 and resistor R141 which produces a steady rise in potential of the control grid of valve TV10. This latter valve is normally biased beyond cut off but is caused to conduct by the rise in potential of its control grid. The condenser C109 and resistor R139 forming the output circuit of this valve are arranged to have a very short time constant with the result that they produce a so called "differentiating" action, that is the onset of the current flow through the valve TV10 produces a short duration negative going pulse over resistor R139. This negative going pulse is applied via rectifier MR14 to the trigger circuit valve TV2 but since this valve is already non-conducting the negative pulse is without effect. The circuit now remains in this condition until the input pulses to terminal 250 are terminated whereupon the circuit releases, as follows. When there cease to be output pulses from the secondary of transformer TR2 which coincides with the pulse from valve TV9, the gate circuit associated with the control grid of valve TV10 is closed. The condenser C108 is rapidly discharged through resistor R141 and valve TV10 is again cut off. The anode potential of the valve rises and due to the differentiating action of condenser C109 and resistor R139, a positive going pulse is applied to the control grid of the trigger valve TV2 which causes valve TV2 to conduct and valve TV1 to be cut off. The fall in anode potential of valve TV2 is applied to the control grid of the cathode follower valve TV3 and the cathode potential of this valve is correspondingly reduced removing the anode potential from the cold cathode tubes such as TVC, causing the tube TVC to be extinguished. The main cathode potential of tube TVC thus falls to —100 v. and consequently the cathode potential of valve TV6 falls also. The control grid of valve TV7 is connected to the cathode of valve TV6 through the slow to release circuit C110, MR115 and R130, consequently when the cathode potential of valve TV6 falls the rectifier MR115 is biased back and the condenser discharges slowly through resistor R130 so that there is a delay before valve TV7 is cut off which ensures that the cold cathode tube TVC has time to de-ionise before the circuit can be taken into use again. When valve TV7 is eventually cut off its anode potential rises to +50 volts thus biasing back rectifiers MR104 and MR108 and allowing input pulses to reach the grid of valve TV1 again.

Figs. 26–29 show in detail the circuits of the several less obvious gate circuits, pulse lengtheners, master selector storage and allotter circuits, multiplex circuits and master selector, that are represented diagrammatically in Figs. 10 and 10$a$ and the following description will assist in the understanding of the circuits shown in the latter figures. For convenience the drawings should be arranged with Fig. 26 on the right and Figs. 27, 28, 29, in that order to the left of Fig. 26. Commencing first with Fig. 26, this shows details of the circuits of the multiplex circuit MX1 and MX2 and inhibiting gates FI3 and FI4. When the exchange marker has received the requisite routing information from the register it applies a backward marking to wire BM which is connected over resistor R951 to lead 19 to multiplex MX1. In gate FI3, rectifier MR951 is connected between lead 19 and lead 19$b$ connected over resistor RA6 to the test wire $p$ in the line circuit. The $p$ wire is normally disconnected and the rectifier is inoperative. When the line circuit is engaged in a set up connection wire $p$ will be at earth potential, or more positive during the operation of the subscriber's meter, and rectifier MR951 will conduct and maintain the lead 19 at earth or positive potential thereby inhibiting the backward marking over wire BM indicating thereby that the line is engaged. In the absence of this inhibition the backward marking signal from the exchange marker, which is —20 v. potential, is transmitted over lead 19 to the multiplex MX1. Resistor R952, condenser C951 and rectifier MR952 form a gate circuit individual to a particular line, similar gate circuits individual to other lines being connected in common to the valve V6. Negative pulses having different positions in the identification TDM cycle for each subscriber's line served by a group of final selectors are applied over terminals such as SX, the terminal SX and the gate circuit shown being individual to the line represented by lead 19. When the backward marking signal is applied over lead 19 and resistor R952, rectifier MR952 conducts and the negative pulses applied over terminal SX are admitted to the grid-cathode circuit of the pentode valve V6 and a potential is derived over resistor R953 making the grid positive with respect to the cathode and the valve conducts, the pulses being amplified by the valve and repeated over the output wire 20 as positive pulses. Multiplex circuit MX2 operates in a similar manner. The lead 19*a* corresponding to lead 19 in MX1 is connected over resistor RA5 (Fig. 3) to the point A which is normally held at earth potential. Resistor R954, condenser C952 and rectifier MR953 form a gate circuit to which negative pulses corresponding in position in the TDM cycle to the line with which lead 19*a* and terminal SX are associated operate the gate to cause the pentode valve V7 to generate positive pulses on its output lead 21. The gate is opened when the potential of point A becomes —20 v. when a line is looped and is in a calling condition.

The pulses generated by the multiplex circuits MX1 and MX2 and the pulse produced by the master selector are fed to the inhibiting gate FI4. Pulses generated by the multiplex MX1 of a line that is in a calling condition will be inhibited at the gate by the corresponding pulse over lead 21 generated by the multiplex MX2 and by pulses generated by the master selector which reach gate FI4 over lead 18. The pulse from the multiple MX1 over lead 20 is fed over condenser C953 to a gate circuit comprising rectifiers MR954 and MR955, resistors R956 and R957, and condenser C954. This gate circuit is also fed by a train of clock pulses over lead KS the pulses of which coincide in turn with every possible pulse in the identification TDM cycle but are shorter than the TDM pulses to ensure that even if the pulse on lead 20 is longer than the pulse intended to inhibit it no output pulse will be produced on lead 2 providing that the inhibiting pulse completely overlaps the clock pulse. In the absence of an input pulse and a clock pulse, current will flow from +50 v. over resistor R955 and the gate circuit rectifiers and resistors in parallel to —50 v., the resistors being of such a value that there will be a greater voltage drop across resistor R955 than across the rectifiers and resistors R956 and R957 with the result that rectifier MR956 will become conductive and clamp the grid of valve V8 to earth potential. If either a positive input pulse or a clock pulse is now received either rectifier MR954 or MR955 as the case may be will be biased back and although the voltage drop across resistor R955 will fall the grid of valve V8 will remain at earth potential. If both pulses are coincident both rectifiers will be biased back and the voltage drop across resistor R955 will fall, further biasing back rectifier MR956 and raising the potential on the grid of valve V8 so that the valve conducts and the potential across cathode resistor R958 gives rise to a positive pulse on lead 2. Pulses corresponding to coincident pulses on lead 20 and clock pulses are therefore reproduced on lead 2 and transmitted to pulse lengthener FPL1. If coincident pulses are also present on lead 18 or 21 they will be transmitted over condenser C955 and rectifier MR957 or over condenser C956 and rectifier MR958 as the case may be to the grid of valve V9 raising its potential and giving rise to the flow of anode current, rectifiers MR959 and MR960 being provided for the purpose of D.C. restoration. It may here be noted that valve V9 is normally biased beyond cut-off by the presence on the grid of —100 v. potential over resistor R959. Rectifier MR956 however, maintains the anode of valve V9 at earth potential and the valve V8 remains conducting.

Figure 29:
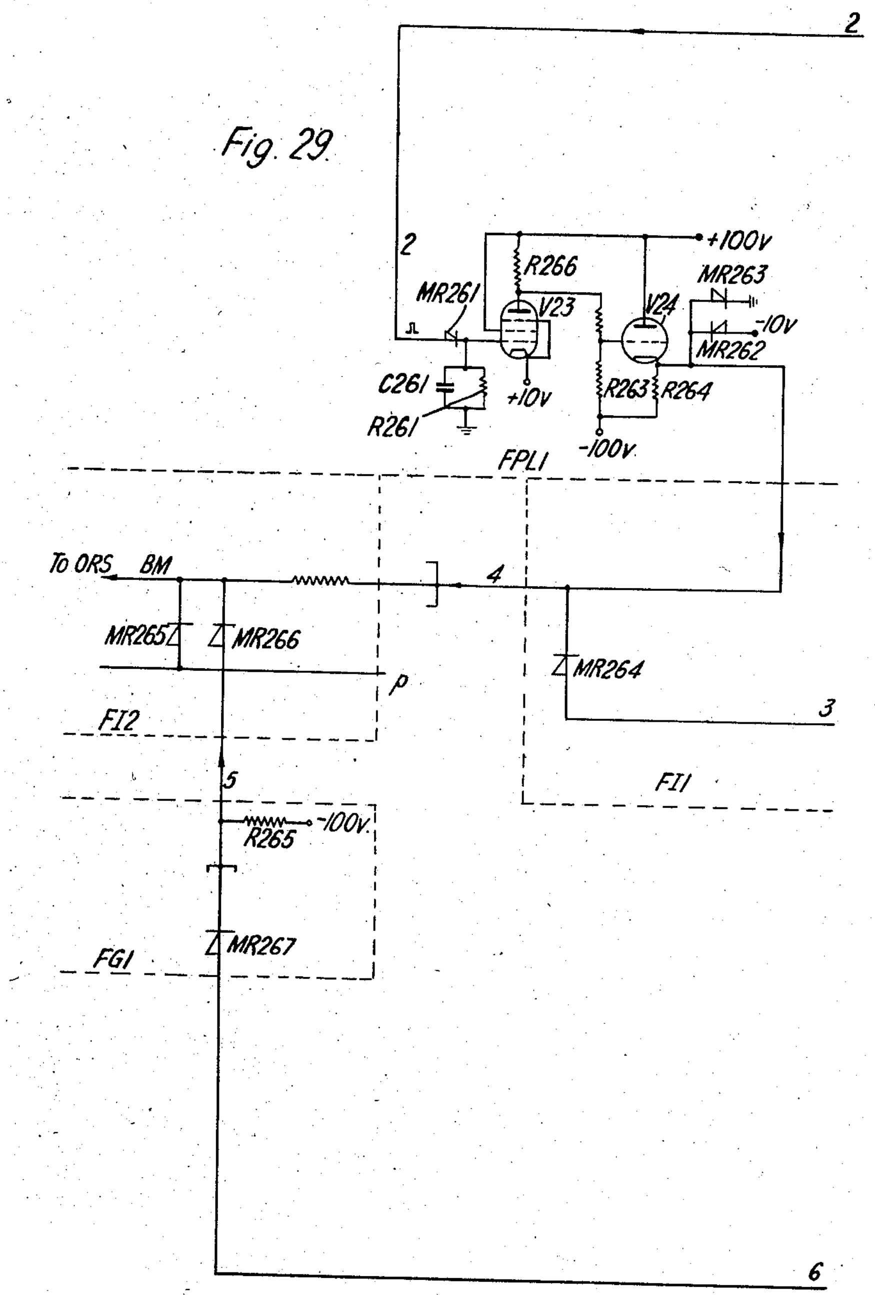

Attention will now be given to the pulse lengthener circuit FPL1 shown in Fig. 29.

The pulses produced on lead 20 by the multiplex MX1 and passing through the inhibiting gate FI4 appear on lead 2 whence they pass to the grid of the pentode valve V23. This valve is normally biased back by the earth potential over resistor R261 and the arrival of a positive pulse over lead 2 and rectifier MR261 charges condenser C261 and the grid potential is raised and the valve conducts. The valve V24 has its control grid connected between the resistors R262 and R263 in the potentiometer formed by the three resistors R266, R262 and R263 and in the absence of anode current flow over the resistor R266 the control grid of valve V24 is positive with respect to the cathode and the valve conducts, consequently there is a potential drop across the cathode resistor R264 which tends to make the cathode rise above earth potential but rectifier MR263 conducts and clamps the cathode of valve V24 to earth potential. When valve V23 becomes conducting there is a fall in potential of the junction of resistors R262 and R263 which causes the valve V24 to be driven beyond cut-off. The cathode potential of valve V24 falls until it is clamped to —10 v. by current flow from —10 v. over rectifier MR262 and resistor R264 to —100 v. and a D.C. potential of —10 v. appears on lead 1 to provide a backward marking signal. This D.C. potential on lead 1 is applied to gate FI1 which consists of rectifier MR264. Gate FI1 is an inhibiting gate and lead 3 is normally at —50 v. potential so that rectifier MR264 is biased back. When the potential on lead 3 is raised above —10 v. by the operation of gate FG2 rectifier MR264 will conduct if the backward marking signal is present on lead 1 thereby shunting the signal from lead 4. In the absence of an inhibiting potential on lead 3 the backward marking signal is transmitted over the leads similar to lead 4 in all the control circuits but the signal is inhibited at gates FI2 of the trunks which are busy. When the trunk circuit is free, the *p* wire in that circuit is disconnected so that rectifier MR265 is inoperative and rectifier MR266 is biased back by —100 v. potential over resistor R265 in gate FG1. When the trunk circuit is busy, wire *p* will be earthed and rectifier MR265 will be conductive and maintain wire BM at earth potential. Rectifier MR266 behaves in similar manner when lead 5 is earthed by the marking applied by the master selector to the marking arc of the control switch over wire 6. Gate FG1 operates in a similar manner to gate FI1, rectifier MR267 being biased back over lead 6 from the master selector and becoming conductive when the potential of this lead is made more positive.

Figure 27:
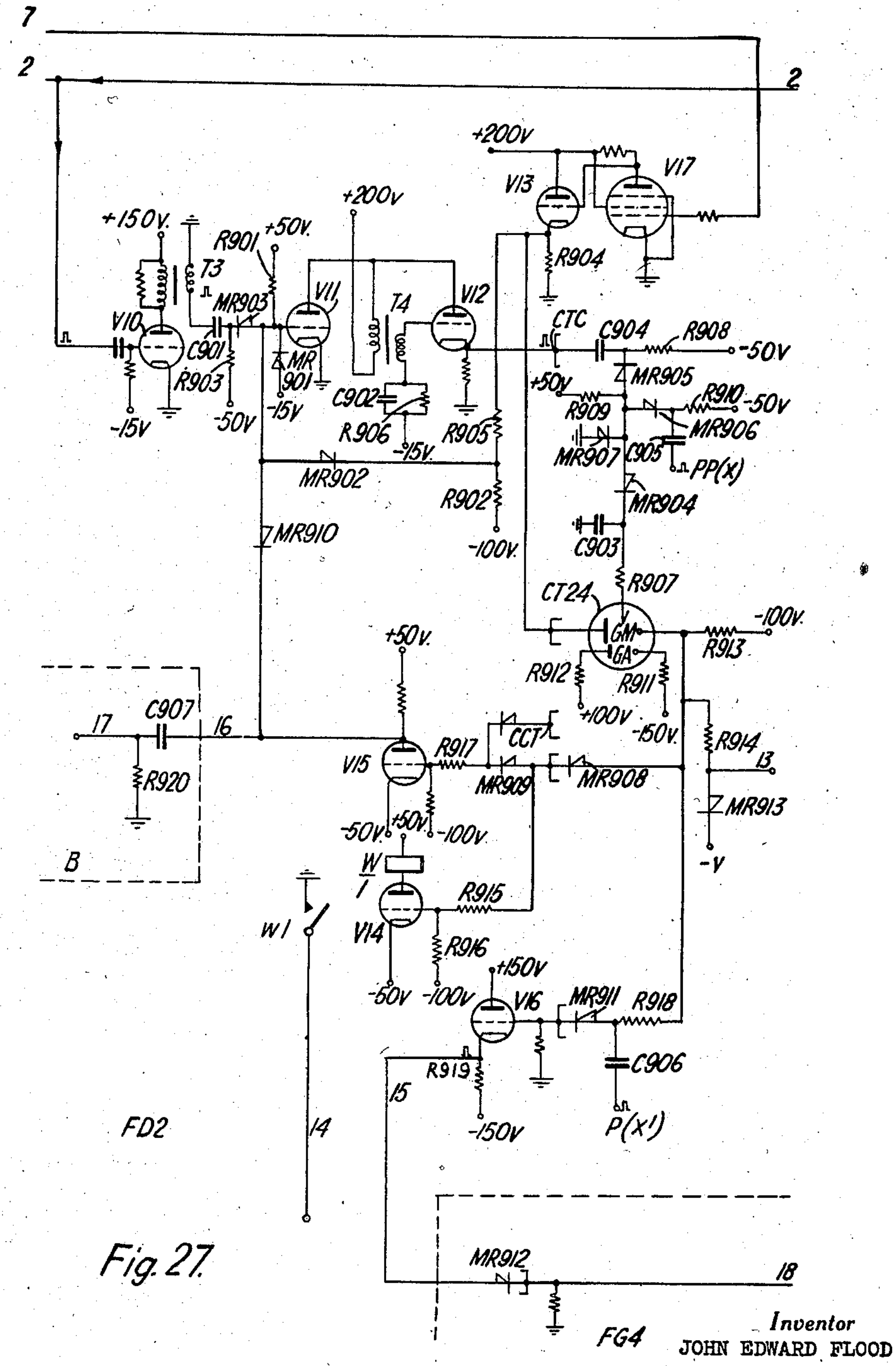

Turning now to Fig. 27 this shows in detail the circuits of the master selector bank side storage circuit FD2, gate FG4 and element B (Fig. 10*a*). Attention will first be given to the master selector storage circuit FD2. This includes thermionic valves V10 to V17 and a plurality of cold cathode tubes of which one is shown at CT24. This group of cold cathode tubes contains one tube for each pulse in the identification TDM cycle. The input to the storage circuit is over lead 2 and output connections are over lead 13 to the marking arcs of the final selectors, lead 14 to the operating circuit for relay FWS in the final selector, lead 15 to gate FG4 and lead 16 to element B. Lead 7 is an inhibiting lead from the wiper side storage circuit FS2. Of the thermionic valves shown, V10 is an input valve, valves V11 and V12 and their associated rectifiers and resistors constitute an input selecting circuit for the operation of a particular cold cathode tube CT24 as determined by co-incident pulses over lead 2 and terminal PP($x$), this latter pulse being derived from the identification TDM cycle. Valves V17 and V13 form part of an inhibiting circuit to ensure that the selection effected by valves V11 and V12 is a "one only" selection.

Positive pulses over lead 2 are amplified by valve V10 which produces a positive output from transformer T3. In the absence of input pulses valve V11 is biased to —15 v. due to conduction of rectifier MR901 in the potentiometer biasing paths existing from +50 v. over resistor R901, rectifier MR902, resistor R902 to —100 v. and via rectifier MR903 and resistor R903 to —50 v. The first positive pulse from transformer T3 is applied via condensers C901 to bias back rectifier MR903 but due to the alternative biasing path for rectifier MR901 valve V11 is unaffected.

Normally a potential of +50 v. is present over wire 7 on the grid of the pentode valve V17 which conducts and cuts off triode valve V13. It will be remembered that in response to a backward marking signal from the exchange marker a positive pulse is applied to wire $s$ in the outgoing relay set and this pulse sets the wiper side storage circuit FS2 which in turn removes the inhibition from the bank side storage circuit FD2. It does this by replacing the potential of +50 v. which normally exists on wire 7 by a potential of −50 v. as will be hereinafter described. This cuts off valve V17 and allows valve V13 to conduct. The rise in cathode potential across resistor R904 causes the potential at the junction of resistors R902 and R905 to become positive and rectifier MR902 is biased back. The next positive pulse from transformer T3 cuts off rectifier MR903 and the grid of valve V11 becomes positive and the valve conducts. Valve V11 shares a common anode load with valve V12 and the anode potential of both valves falls. Valve V12 is connected in a blocking oscillator circuit and the large positive feed back through transformer T4 causes a large amplitude positive pulse to be applied to the control grid of this valve resulting in the flow of large anode and grid currents. The grid current produces a large negative charge on condenser C902 with the result that at the end of the positive input pulse the valve is biased beyond cut-off and the discharge time constant of the combination of condenser C902 and resistor R906 is made such that the circuit is maintained in its blocked condition for at least the time required for a complete cycle of the input pulse train. Thus, only one pulse in the cycle is applied to the circuits of the cold cathode tubes from the cathode of valve V12. Each of the cold cathode tubes is connected to the cathode of valve V12 over the common point CTC. The tube CT24 is connected via a pulse lengthener circuit comprising rectifier MR904, condenser C903 and resistor R907 and a gate circuit comprising rectifier MR905, MR906 and MR907, resistors R908, R909 and R910 and condensers C904 and C905. Other tubes are similarly connected to other gate circuits. The pulse from the cathode of valve V12 is applied to the gate circuit shown via condenser C904 and cuts off rectifier MR905. If this pulse is coincident with the pulse applied via condenser C905 (the pulse applied to each gate circuit via the terminal PP($x$) occupying a different time position in the identification TDM system) the rectifier MR906 will also be biased back and the potential of the junction between these two rectifiers rises biasing back rectifier MR907 until current from the +50 terminal via resistor R909 and rectifier MR905 causes the junction point of the gate switching rectifiers to be clamped to the potential of the input pulse applied to condenser C904. Thus, when the pulse applied from the cathode of valve V12 is coincident with the pulse associated with the cold cathode tube the associated gate circuit applies a positive potential to charge the pulse lengthener condenser C903 via rectifier MR904. The potential of the junction of this condenser and rectifier is thus raised sufficiently to fire tube CT24. Tube CT24 is of the type which has a discharge permanently present across an auxiliary gap GA to which current is fed over resistors R911 and R912 which are connected respectively to −150 v. and +100 v., and this discharge serves to increase the sensitivity of the trigger gap. When the main gap GM breaks down, the potential difference across the resistor R913 causes the potential of the main cathode to rise from −100 v. to −V. A potential of −V characteristic of the particular master selector is applied to the main cathode of tube CT24 over rectifier MR913 and resistor R914 and serves as a reference potential for the potential derivation device PD in the final selector control circuit to identify the marked line in the banks of the final selectors. If the tube CT24 is associated with a line for which wiper switching in the final selector is required the main cathode potential of the tube is also applied over rectifier MR908 and resistor R915 to the grid of tube V14. Valve V14 is normally biased beyond cut-off by the negative potential applied to the grid over resistor R916 and becomes conductive by the rise in potential due to the firing of the main gap of tube CT24. Relay W connected in the anode circuit of valve V14 is energised and at its contact $w1$ applies earth to wire 14 for the operation of the wiper switching relay in the final selector. The rectifiers corresponding to MR908 associated with all the cold cathode tubes are also connected over rectifier MR909 and resistor R917 to the grid of valve V15. This valve is connected similarly over other rectifiers to the main cathodes of the cold cathode tubes associated with lines that do not require wiper switching in the final selector, the connection being indicated by the common point CCT. Thus, when any cold cathode tube fires valve V15 becomes conducting and its anode falls below earth potential causing rectifier MR910 to conduct to inhibit the input to valve V11 and prevent further pulses from entering the store. The rise in potential of the main cathode of tube CT24 also opens the gate comprising resistor R918, condenser C906 and rectifier MR911 to allow the pulse over terminal P($x^1$) associated with tube CT24 to reach the grid of valve V16, the pulse over terminal P($x^1$) being coincident with that over terminal PP($x$). Valve V16 is a cathode follower the output of which is a positive pulse derived over resistor R919 which is transmitted over lead 15 to gate FG4 which combines together the output leads from the different bank side storage circuits contained in the master selector and passes them over lead 18 to the inhibiting gate FI4. Each pulse on lead 15 causes lead 18 to become positive, biasing back rectifiers like MR912 associated with all the other master selectors and inhibiting the pulse at gate FI4.

Whenever valve V15 becomes conducting the anode potential, which falls below that of earth, appears on lead 16 and the wave front is differentiated by condenser C907 and resistor R920 in element B to produce a short negative pulse on wire 17 for the purpose of providing a "selector connected" signal over wire SC to the exchange marker.

Figure 28:
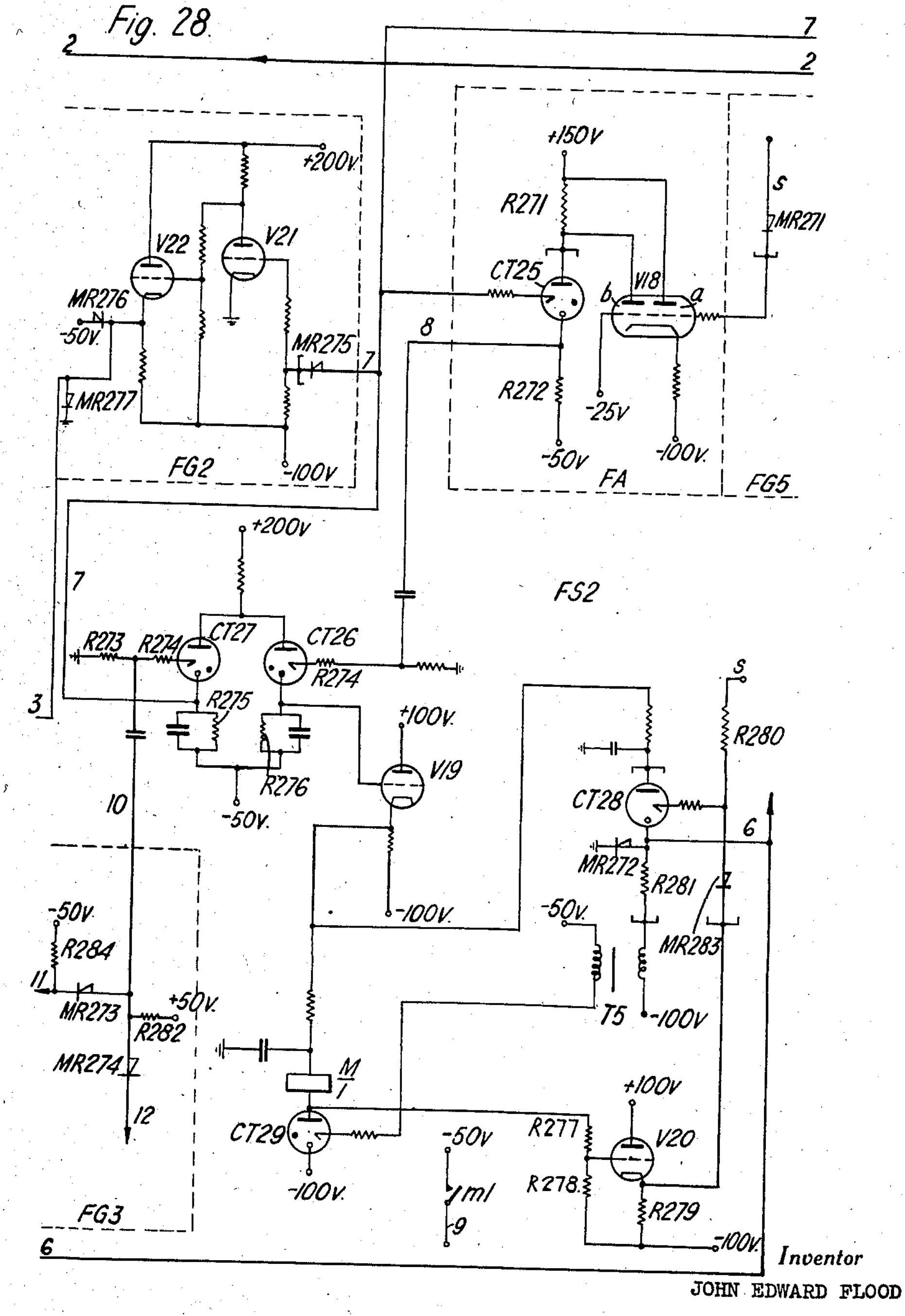

The group of circuits consisting of allotter FA, wiper side storage circuit FS2 and gates FG2, FG3, and FG5 will now be described with reference to Fig. 28. Reference will first be made to the allotter FA. This circuit includes a cold cathode tube CT25 for each master selector and a double triode thermionic valve V18 common to all the master selectors. One section $a$ of valve V18 has its grid connected through the gate circuit FG5 to the wires $s$ of all the outgoing trunks and its anode connected directly to a source of +150 v. The other section $b$ of the valve has its anode connected to the resistor R271 common to it and all the tubes corresponding to CT25. Normally the grid of section $b$ of the valve is at −25 v. potential and this section is conducting and the grid of section $a$ is at a potential of −50 v. derived over resistor R801 in the outgoing relay set and is nonconducting, the cathode potential being derived from a source of −100 v. If the tube CT25 is associated with a free master selector a potential of +50 v. will be present on its striker electrode and a discharge will take place between this electrode and the cathode. A discharge between the anode and cathode will not normally take place as the anode potential over the common resistor R271 will be insufficient. When a positive pulse is received over wire $s$ it passes over rectifier MR271 to the grid of section $a$ of valve V18 thereby biasing back the rectifiers like MR271 connected to wires $s$ of other trunks, the potential of the grid is raised and section $a$ of the valve conducts thereby cutting off section $b$. The consequent rise in potential of the end of resistor R271 allows one of the cold cathode tubes to discharge in its anode cathode circuit and similar discharges in the other tubes connected in common are prevented. In consequence of the discharge now taking place in tube CT25 a positive pulse derived over cathode resistor R272 is applied over lead 8 to the wiper side store FS2 thereby causing the cold cathode tube CT26 therein to strike. Cold cathode tubes CT26 and CT27 are arranged in known manner so that one of them is normally conducting and the other extinguished. Normally tube CT27 is conducting and tube CT26 extinguished and the receipt of the pulse at tube CT26 causes that tube to strike and tube CT27 to be extinguished. When this occurs the potential on lead 7 falls to −50 v. and this lead being connected to the striker electrode of tube CT25 marks the master selector engaged by preventing the associated tube CT25 re-striking if another setting pulse is received over wire *s*. The −50 v. potential on lead 7 also causes valve V13 in the storage circuit FD2 to become conducting to permit operation of the valves V11 and V12 to respond to input pulses on lead 2 as previously described. On the termination of the pulse over wire *s* section *a* of valve V18 again becomes non-conducting and section *b* of this valve again conducts with the result that tube CT25 is extinguished due to reduction of its anode potential. If a further pulse is received over wire *s* some other cold cathode tube will strike and another master selector will be taken into use.

Returning now to the arrangements of the tube CT26 and CT27 it will be seen that the striker electrode of tube CT27 is normally at earth potential applied over resistors R273 and R274 and the tube will accordingly support an anode-cathode discharge. A positive potential derived over the cathode resistor R275 of tube CT27 will be present on lead 7 as above mentioned. When the striker electrode of tube CT26 receives a positive pulse over lead 8 it strikes and tube CT27 is extinguished thereby converting the potential on lead 7 from +50 v. to −50 v. A positive potential derived over cathode resistor R276 of tube CT26, now conducting, is applied to the grid of thermionic valve V19 causing that valve to conduct thereby applying a positive anode potential for the operation of cold cathode tube CT29 and a group of cold cathode tubes of which CT28 is one. This potential is also applied to the grid-cathode circuit of the thermionic valve V20 over the potentiometer formed by resistor R277 and R278 thereby causing valve V20 to conduct. A positive potential is developed across cathode resistor R279 which biases back all the rectifiers MR283 connected to the wire *s* over resistor R280. There is a tube corresponding to tube CT28 associated with each outgoing trunk, the striker electrodes of these tubes being connected to the respective *s* wires of the trunks. When a positive pulse appears on wire *s* of the trunk associated with the tube CT28 shown and the anode potential to the tube has been applied by the operation of valve V19 as described, tube CT28 strikes. Its cathode potential, applied over the primary winding of transformer T5 in common to all the tubes and over resistor R281 of the individual tube, rises and is clamped to earth by rectifier MR272 thereby applying an earth marking on wire 6 extending to the marking arc of the final selector control switch and via gate FG1 to the inhibiting gate FI2 to inhibit the trunk to other master selectors. Flow of current through the primary winding of transformer T5 induces an E.M.F. in the secondary winding which is applied to the striker electrode of tube CT29 causing that tube to strike. Relay M connected in the anode circuit of tube CT29 operates and contact *m*1 applies −50 v. over wire 9 to latch magnet FLA of the master selector coupling switch. The fall in the anode potential on tube CT29 is communicated to the grid-cathode circuit of valve V20 causing the valve to become non-conducting and its cathode potential to fall to about −50 v. Consequently, any subsequent setting signals applied to the storage circuit over any of the *s* wires do not strike further cold cathode tubes CT28 because each rectifier MR283 prevents the trigger potential of the tube from being raised above the cathode potential of valve V20. From an inspection of Fig. 3 it will be seen that there is normally a potential of −50 v. on the *p* wire in the subscriber's line circuit and when this wire is switched through by the operation of the final selector switching relay this potential is raised to that of earth. Reference to gate FG3 will show that during the setting up of a connection by the final selector wires 11 and 12 will both be at a potential of −50 v. and current from +50 v. will flow over resistor R282 to −50 v. over the parallel circuits formed by rectifier MR273 and resistor R284 and rectifier MR274 and the holding winding of relay FH (Fig. 9). Due to the flow of current over resistor R282, wire 10 will be brought to a negative potential of approximately −50 v. When wire 11 is earthed by operation of the final selector test relay, rectifier MR273 will be biased back due to continued flow of current through rectifier MR274 maintaining wire 10 at a negative potential. When the *p* wire is also earthed neither rectifier MR273 nor MR274 will be biased back and both these rectifiers will conduct and the potential of wire 10 will be clamped to that of earth and tube CT27 will be struck and tube CT26 extinguished. Striking of tube CT27 reapplies positive potential to lead 7 extinguishing tube CT26 and causing valves V19 and V20 and tube CT29 to become non-conducting and tube CT28 to be extinguished and the master selector to be released.

In the gate circuit FG2, there is an input rectifier MR275 for each master selector circuit included in the common control circuit and so long as at least one master selector is free the rectifier MR275 associated with the free master selector will be conducting due to the potential of approximately +50 v. present on the lead 7 and as a result valve V21 will pass anode current. When all the master selectors are in use all the input leads 7 will be at −50 v. potential and consequently valve V21 will cease to conduct and the rise of its anode potential will be communicated to the grid cathode circuit of cathode follower valve V22 and the consequent rise in potential of the cathode of this valve brings lead 3, which was previously clamped to −50 v. by rectifier MR276, to earth potential at which it is held by rectifier MR277. This earth passes to gate FI1, to prevent backward marking signals being applied to any of the trunks from the outgoing relay sets. The exchange marker is arranged so that if it does not receive the master selector connected signal within a predetermined short time interval it automatically releases and then makes another attempt to set up the wanted connection, by which time a master selector may have become free.

What is claimed is:

1. An automatic telephone system in which connections within an exchange are set up by a switching system comprising a plurality of backward-hunting line finders each constituted by an electromechanical switch having a bank side and a wiper side, a plurality of forward-hunting final selectors each constituted by an electromechanical switch having a bank side and a wiper side, subscribers' lines connected to the banks of the line finders and final selectors, a plurality of time-division-multiplex selecting switches each having a selector side and a bank side and each comprising a common pulse highway linking the two sides of the switch on a time division multiplex basis and serving for speech transmission between the two sides of the switch, said plurality of time-division-multiplex selecting switches being arranged and interconnected to constitute two serially connected ranks comprising a rank of incoming selecting switches and a rank of outgoing selecting switches, for the serial connection of said two serially connected ranks a plurality of link pulse highways each linking the bank side of an incoming selecting switch to the bank side of an outgoing selecting switch, a plurality of audio frequency trunks connecting the wiper sides of the line finders to the selector sides of the incoming selecting switches and a plurality of audio frequency trunks connecting the selector sides of the outgoing selecting switches to the wiper sides of the final selectors, for and individual to each said audio frequency trunk modulating and demodulating equipment forming part of the selector side of the particular time-division-multiplex selecting switch to which the trunk is connected and serving for coupling the trunk to the common pulse highway of this switch, a plurality of registers each adapted to register a called subscriber's designation, means for connecting a calling subscriber's line to one of said registers for the registration of the called subscriber's designation in this register, means comprising an exchange marker for marking in accordance with such registration in a register all free paths through the exchange between the called subscriber's line and the incoming selecting switch serving the calling subscriber's line, means for selecting and appropriating one of the marked free paths, a plurality of master selector circuits each available in common to a plurality of final selectors, storage equipment in each said master selector circuit operable in response to the selection of a marked free path that includes a final selector served by the master selector circuit to record the identities of this final selector and of the outlet thereof included in the selected path, means in each said master selector circuit operable upon the completion of such recording in the master selector circuit in respect of a call to transmit a signal to the exchange marker to render this marker available for use on another call, and means in each said master selector circuit operable subsequent to the recording of the identities of a final selector and of an outlet thereof in the master selector circuit to control the setting of this final selector to this outlet.

2. An automatic telephone system as claimed in claim 1 in which each of said plurality of audio frequency trunks connecting the wiper sides of the line finders to the selector sides of the incoming selecting switches includes supervisory equipment comprising means operable in response to the looped condition of a calling subscriber's line to extend a forward hold signal to the incoming selecting switch to which the trunk is connected.

3. An automatic telephone system as claimed in claim 1 in which each of said plurality of audio frequency trunks connecting the selector sides of the outgoing selecting switches to the wiper sides of the final selectors includes supervisory equipment comprising means for extending a backward hold signal to the outgoing selecting switch to which the trunk is connected and means operable in response to termination of the looped condition of a called subscriber's line to terminate such extension of a backward hold signal.

References Cited in the file of this patent

UNITED STATES PATENTS

| | | |
|---|---|---|
| 2,694,751 | Den Hertog | Nov. 6, 1954 |
| 2,773,934 | Trousdale | Dec. 11, 1956 |